(12) United States Patent
Ludwig

(10) Patent No.: US 8,396,701 B2
(45) Date of Patent: Mar. 12, 2013

(54) SOFTWARE SYSTEMS FOR DEVELOPMENT, CONTROL, PROGRAMMING, SIMULATION, AND EMULATION OF FIXED AND RECONFIGURABLE LAB-ON-A-CHIP DEVICES

(76) Inventor: Lester F. Ludwig, Redwood Shores, CA (US)

( * ) Notice: Subject to any disclaimer, the term of this patent is extended or adjusted under 35 U.S.C. 154(b) by 857 days.

(21) Appl. No.: 12/328,726

(22) Filed: Dec. 4, 2008

(65) Prior Publication Data
US 2009/0150130 A1 Jun. 11, 2009

Related U.S. Application Data

(60) Provisional application No. 61/005,460, filed on Dec. 4, 2007.

(51) Int. Cl.
*G06F 17/50* (2006.01)
(52) U.S. Cl. .................... 703/13; 703/1; 703/14
(58) Field of Classification Search ............... 703/1, 13, 703/14
See application file for complete search history.

(56) References Cited

U.S. PATENT DOCUMENTS

| | | | |
|---|---|---|---|
| 2002/0100714 A1* | 8/2002 | Staats | 210/85 |
| 2008/0223721 A1 | 9/2008 | Cohen et al. | |
| 2009/0121476 A1 | 5/2009 | Malito et al. | |

OTHER PUBLICATIONS

SystemC Version 2.0, User's Guide. Update for SystemC 2.0.1 Copyright 1996-2002.*
"Microfluidic lab-on-a-chip systems based on polymers-fabrication and application", Guber, et al. Chemical Engineering Journal 101. 2004.*
"Lab-on-a-chip: A Revolution in Biological and Medical Sciences", Figeys, et al. Analytical Chemistry, May 1, 2000.*
"Disposable Smart Lab on a Chip for Point-of-Care Clinical Diagnostics", Ahn, et al. 2004 IEEE.*
"Lab on a Chip for Live-Cell Manipulation", Medoro, et al. 2007 IEEE.*
"System-Oriented Modeling and Simulation of Biofluidic Lab-on-a-Chip", Wang et al. 2005 IEEE.*
"Automated Design of Pin-Constrained Digital Microfluidic Arrays for Lab-on-a-Chip Applications", Hwang, et al. Jul. 24-28, 2006.*
"Composable Behavioral Models and Schematic-Based Simulation of Electrokinetic Lab-on-a-Chip Systems", Wang, et al. Feb. 2006.*
Unified High-Level Synthesis and Module Placement for Defect-Tolerant Microfluidic Biochips*. Fei Su and Krishnendu Chakrabarty, 2005, available at http://people.ee.duke.edu/~krish/p825.pdf.
Heterogeneous System-Level Specification in Systemc, Fernando Herrera, Pablo Sanchez and Eugenio Villar Advances in Design and Specification Languages for SoCs, Pierre Boulet, 2006, Abstract only.

(Continued)

*Primary Examiner* — Omar Fernandez Rivas
*Assistant Examiner* — Nithya J Moll
(74) *Attorney, Agent, or Firm* — Procopio, Cory, Hargreaves & Savitch LLP

(57) ABSTRACT

A software system for development, control, programming, simulation, and emulation of fixed, software-configurable, software-reconfigurable, and software-controlled Lab-on-a-chip ("LoC") devices. Files may be used to specify LoC configurations for models, emulation, and fabrication, and scripts can be implemented to control numerical simulations as well as physical emulations of modeled LoC devices. Other features include a control software design tool, fabrication design systems, and an authoring/editing tool for specification files. In some cases, an active data visualization system provides visualizations of real-time data generated by past and current simulations and emulations.

20 Claims, 16 Drawing Sheets

OTHER PUBLICATIONS

Development of a Microfluidic Unit for Sequencing Fluid Samples for Composition Analysis, V. Tesar*, J. R. Tippetts, Y. Y. LOWand R. W. K. Allen, Institution of Chemical Engineers, Trans IChemE, Part A, Jun. 2004, Chemical Engineering Research and Design, 82(A6): 708-718, available at http://eprints.whiterose.ac.uk/468/1/tesarv2.pdf.

A Toy Model of Chemical Reaction Networks, Gil Benk o, Nov. 2002, available at http://www.tbi.univie.ac.at/papers/Abstracts/gil_dipl.pdf.

Electric Power Generated from Waste Heat, Translation of the AIST press released on May 31, 2005, available at http://www.aist.go.jp/aist_e/latest_research/2005/20050617/20050617.html, accessed on Jun. 12, 2006.

AquaCore: A Programmable Architecture for Microfluidics, Ahmed M. Amin, Mithuna Thottethodi, T. N. Vijaykumar Steven Wereley=, and Stephen C. Jacobsoni, 2007, available at https://engineering.purdue.edu/ploc/publications/isca07. pdf.

Unified High-Level Synthesis and Module Placement for Defect-Tolerant Microfluidic Biochips*. Fei Su and Krishnendu Chakrabarty, 2005, available at http://people.ee.duke.edu/~krish/p825.pdf.

Architectural-Level Synthesis of Digital Microfluidics-Based Biochips, Fei Su and Krishnendu Chakrabarty, Published in Proc. IEEE International Conference on CAD, pp. 223-228, 2004, available at http://www.sigda.org/daforum/abs/44_attachment.pdf.

A Scheduling and Routing Algorithm for Digital Microfluidic Ring Layouts with Bus-phase Addressing. Megha Gupta and Srinivas Akella, Proceedings of the 2007 IEEE/RSJ International Conference on Intelligent Robots and Systems San Diego, CA, USA, Oct. 29-Nov. 2, 2007, available at http://www.cs.rpi.edu/twiki/pub/RoboticsWeb/LabPublications/GAiros07.pdf.

Digital microfluidics: is a true lab-on-a-chip possible?, Microfluidics and Nanofluidics, vol. 3, No. 3 / Jun. 2007.

Digital microfluidic design and optimization of classic and new fluidic functions for lab on a chip systems, Microfluidics and Nanofluidics, vol. 4, No. 3 / Mar. 2008.

Arrays for Digital Signal Processing Functions: Fault Tolerance and Functional Reconfiguration, A. Antola, R. Negrini, M.G. Sami and N. Scarabottolo, Reconfigurable Massively Parallel Computers, Hungwen Li and Quentin F. Stout, pp. 170-222, 1991.

Motivation: Mission-critical Computing, Problems and Solutions, Svetlana P. Kartashev and Steven I. Kartashev, Designing and Programming Modern Computer Systems: Supercomputing Systems : Reconfigurable Architectures, pp. 1-17, 1989.

Nonrobotic Automated Workstations for Solution Phase Synthesis, Laboratory Automation in the Chemical Industries, David G. Cork and Tohru Sugawara, pp. 41-72, 2002.

Heterogeneous System-Level Specification in Systemc, Fernando Herrera, Pablo Sánchez and Eugenio Villar Advances in Design and Specification Languages for SoCs, Pierre Boulet, pp. 199-206, 2006.

Introduction to Reconfigurable Hardware, Nikolaos Voros and Konstantinos Masselos, System Level Design of Reconfigurable Systems-on-Chip, pp. 15-26, 2005.

Design Flow for Reconfigurable Systems-on-Chip, Nikolaos Voros and Konstantinos Masselos, System Level Design of Reconfigurable Systems-on-Chip, pp. 107-131, 2005.

SystemC Based Approach, Yang Qu and Kari Tiensyrjä, System Level Design of Reconfigurable Systems-on-Chip, pp. 87-105, 2005.

Synthesis of Multiplexed Biofluidic Microchips, Anton Pfeiffer, Tamal Mukherjee and Steinar Hauan, Design Automation Methods and Tools for Microfluidics-Based Biochips, pp. 271-300, 2006.

Modeling and Controlling Parallel Tasks in Droplet-Based Microfluidic Systems, Karl Böhringer, Design Automation Methods and Tools for Microfluidics-Based Biochips, pp. 301-327, 2006.

Performance Characterization of a Reconfigurable Planar Array Digital Microfluidic System, Eric Griffth, Srinivas Akella and Mark Goldberg, Design Automation Methods and Tools for Microfluidics-Based Biochips, pp. 329-356, 2006.

Fluidic Valves for Variable-Configuration Gas Treatment, V.Tesar, Institution of Chemical Engineers, Trans IChemE, Part A, Sep. 2005, Chemical Engineering Research and Design, 83(A9): 1111-1121, available at http://eprints.whiterose.ac.uk/758/1/tesarv6.pdf.

Development of a Microfluidic Unit for Sequencing Fluid Samples for Composition Analysis, V. Tesar*, J. R. Tippetts, Y. Y. LOWand R. W. K. Allen, Institution of Chemical Engineers, Trans IChemE, Part A, Jun. 2004, Chemical Engineering Research and Design, 82(A6): 708-718, available at http://eprints.whiterose.ac.uk/468/1/tesarv2.pdf.

Sampling by Fluidics and Microfluidics, V. Tesař, Acta Polytechnica vol. 42 No. 2/2002.

Lectures on Chemical Reaction Networks: Introduction, Martin Feinberg,1979, available at http://www.che.eng.ohio-state.edu/~feinberg/LecturesOnReactionNetworks/images/FeinbergLecture1.pdf, accessed on Jun. 12, 2006.

Lectures 2: Reaction Networks, Kinetics, and the Induced Differential Equations, Martin Feinberg,1979, available at http://www.che.eng.ohio-state.edu/~feinberg/LecturesOnReactionNetworks/images/FeinbergLecture2.pdf, accessed on Jun. 12, 2006.

Lectures 3: Two Theorems, Martin Feinberg,1979, available at http://www.che.eng.ohio-state.edu/~feinberg/LecturesOnReaction-Networks/images/FeinbergLecture3.pdf, accessed on Jun. 12, 2006.

Lectures 4: Some Definitions and Propositions, Martin Feinberg,1979, available at http://www.che.eng.ohio-state.edu/~feinberg/LecturesOnReactionNetworks/images/FeinbergLecture4.pdf, accessed on Jun. 12, 2006.

Lectures 5: Proof of the Deficiency Zero Theorem, Martin Feinberg,1979, available at http://www.che.eng.ohio-state.edu/~feinberg/LecturesOnReactionNetworks/images/FeinbergLecture5.pdf, accessed on Jun. 12, 2006.

A Toy Model of Chemical Reaction Networks, Gil Benko, Nov. 2002, available at http://www.tbi.univie.ac.at/papers/Abstracts/gil_dipl.pdf.

Development of a MEMS Microvalve Array for Fluid Flow Control, Nelsimar Vandelli, Donald Wroblewski, Margo Velonis, and Thomas Bifano, Journal of Microelectromechanical Systems, vol. 7, No. 4, Dec. 1998, available at http://sws1.bu.edu/bifano/PDF_files/23_Flow.pdf.

The Chemical Reaction Network Toolbox: Downloads and Instructions, Martin Feinberg, available at http://www.chbmeng.ohio-state.edu/~feinberg/crnt/, accessed on Jun. 12, 2006.

Device could convert waste heat into electricity, Elizabeth A. Thomson, MIT Tech Talk, Dec. 5, 2001, available at http://web.mit.edu/newsoffice/2001/electricity-1205.html, accessed on Jun. 12, 2006.

Development of a Rapid-Response Flow-Control System Using MEMS Microvalve Arrays, John Collier, Donald Wroblewski, and Thomas Bifano, Journal of Microelectromechanical Systems, vol. 13, No. 6, Dec. 2004, available at http://128.197.153.21/tgb/PDF_files/Valves.pdf.

A Novel Pressure Balanced Microfluidic Valve, J. M. Quero, A. Luque, L. G. Franquelo, Proc. ISCAS 2002, May 26-29, available at http://woody.us.es/~aluque/doc/pressure_balanced_microvalve.pdf.

Fabrication of Polysilicon Micro Valve Array, Jermaine White, 22rd Annual Microelectronic Engineering Conference, May 2004, available at http://www.rit.edu/~w-ue/ameccontent/17_JWhite.pdf.

Parker R-max™ Stream Switching System, Parker Instrumentation, Catalog 4140-R, Revised, Jun. 2002, available at http://www.plesner.as/mod/products/upload/4140-R.pdf.

Fast Switching Valves: Ultra Fast and Highly Repeatable, FESTO Corp, Info 96 207 US, Jun. 2005, available at http://www.zycon.com/Literature/219948/75280/Info207_FastSwitchingV.pdf.

Electric Power Generated from Waste Heat, Translation of the AIST press released on May 31, 2005, available at http://www.aistgo.jp/aist_e/latest_research/2005/20050617/20050617.html, accessed on Jun. 12, 2006.

Flow Selection Valves: Series 105T Valve, Bio-Chem Fluidics, 2010, available at https://www.biochemfluidics.com/cart/store/comersus_listOneCategory.asp?idCategory=393, accessed on Jun. 12, 2006.

Flow Selection Valves: Series 080T Valve, Bio-Chem Fluidics, 2010, available at https://www.biochemfluidics.com/cart/store/comersus_listOneCategory.asp?idCategory=392, accessed on Jun. 12, 2006.

Cheminert® Valves for Flow Injection Analysis, FIAlab Instruments, 2010, available at http://www.flowinjection.com/valves.html, accessed on Jun. 12, 2006.

Solenoid valves and eletric valve, Peter Paul Electronics Co., Inc., 2010, available at http://www.peterpaul.com/whats__new__display2.php4?cat__id=6, accessed on Jun. 12, 2006.

Gems Predyne Pneumatic Solenoid Valves & Miniature Solenoid Valves: general-purpose-valves, Gems Sensors & Controls, 2010, available at http://www.gemssensors.com/Search.aspx?q=general-purpose-valves, accessed on Jun. 12, 2006.

Gems Predyne Pneumatic Solenoid Valves & Miniature Solenoid Valves: isolation-valves, Gems Sensors & Controls, 2010, available at http://www.gemssensors.com/Search.aspx?q=isolation-valves, accessed on Jun. 12, 2006.

1200 Series Valve Solutions, Agilent Technologies, 2000-2010, available at http://www.chem.agilent.com/en-us/products/instruments/lc/1200seriesvalvesolutions/pages/default.aspx, accessed on Jun. 12, 2006.

Valve matrix takes squeeze out of juice production, Prepared Foods, Oct. 1997, available at http://findarticles.com/p/articles/mi__m3289/is__n11__v166/ai__20224164/, accessed on Jun. 12, 2006.

Valve Matrix Operating Instructions, GEA Process Equipment Division, 2003, available at http://www.tuchenhagen.com/tuchenhagen/cmsdoc.nsf/webdoc/ndkw73galz.

Solenoid Valve Manifolds, Precision Dynamics, 2004, exercised on Jun. 12, 2006 at http://www.predyne.com/manifols.html, accessed on Jun. 12, 2006.

* cited by examiner

Figure 9a  Figure 9b

SOFTWARE SYSTEMS FOR DEVELOPMENT, CONTROL, PROGRAMMING, SIMULATION, AND EMULATION OF FIXED AND RECONFIGURABLE LAB-ON-A-CHIP DEVICES

CROSS-REFERENCE TO RELATED APPLICATIONS

Pursuant to 35 U.S.C. Section 119(e), this application claims benefit of priority from provisional patent application Ser. No. 61/005,460, filed Dec. 4, 2007, the contents of which are hereby incorporated by reference herein in their entirety.

FIELD OF THE INVENTION

The present invention generally pertains to the design of lab-on-a-chip devices, and in particular to the specification, numerical simulation and physical emulation of chemical processing systems therein operating under software control.

SUMMARY OF THE INVENTION

Features and advantages of the invention will be set forth in the description which follows, and in part will be apparent from the description, or may be learned by practice of the invention. The objectives and other advantages of the invention will be realized and attained by the structure particularly pointed out in the written description and claims hereof as well as the appended drawings.

An embodiment includes a system for the development of a software-controlled Lab-on-a-chip ("LoC") device. The system includes a specification language file for specifying LoC element attributes of elements and interconnections among elements, the specification file for determining a model for an LoC device; an authoring/editing tool for creating and/or editing the specification file; an operating language script for controlling the operation of a modeled LoC device; a control design tool for creating and/or editing the operational language script; a numerical simulation system for producing a real-time numerical simulation of the operation of the model LoC device; a data visualization system for creating real-time visualizations of data from the numerical simulation; wherein the authoring/editing tool, control design tool, numerical simulation system, and data visualization system are integrated into a common system sharing the specification language file and operational language script.

BRIEF DESCRIPTION OF THE DRAWINGS

The above and other aspects, features, and advantages of the present invention will become more apparent upon consideration of the following description of preferred embodiments, taken in conjunction with the accompanying figures.

FIGS. 9a-9c depict how the exemplary subsystem design of FIG. 8b may be constructed in steps from the exemplary primitive elements of FIG. 8a to assemble larger subassembly designs, and using these and copies of them to assemble the FIG. 8b subsystem design.

FIG. 10b depicts a multi-channel chemical delivery bus design that may be constructed from multiple copies of the subassembly of FIG. 10a.

These and other embodiments will also become readily apparent to those skilled in the art from the following detailed description of the embodiments having reference to the attached figures, the invention not being limited to any particular embodiment disclosed.

DETAILED DESCRIPTION OF THE PREFERRED EMBODIMENTS

In the following detailed description, reference is made to the accompanying drawing figures which form a part hereof, and which show by way of illustration specific embodiments of the invention. It is to be understood by those of ordinary skill in this technological field that other embodiments may be utilized, and structural, electrical, as well as procedural changes may be made without departing from the scope of the present invention. Wherever possible, the same reference numbers will be used throughout the drawings to refer to the same or similar parts.

Common works include the design and analysis of isolated components and phenomena, with some addressing prototype small-scale fixed function subsystems. Past and current visions of "Lab-on-a-chip" implementations generally focus on the custom design device precisely matched to a narrow vertical application. Some of the many envisioned lab-on-a-chip applications include:

Real-time Polymerase Chain Reaction (PCR detection of bacteria, viruses and cancers);
Immunoassay (detection of bacteria, viruses, cancers via antigen-antibody reactions);
Dielectrophoresis (detecting cancer cells and bacteria via position shifts from electric field);
Blood sample preparation;
Body fluid analysis;
Air and water pollution monitoring;
Enhanced flow injection system implementation;
Very small, very low cost gas and liquid chromatography elements;
Drug discovery;
Cellular lab-on-a-chip for single-cell analysis.

Each of these diverse vertical application areas will indeed readily develop causing a need to fabricate highly-customizable devices. In the interim, there is a problem: maintaining this viewpoint and associated status quo will likely keep lab-on-a-chip technology exotic and largely unreachable for all but well-funded experimental projects and rare product development efforts for many years to come. Consequently, pent-up demand remains for the realistically foreseeable future. This is unfortunate as lab-on-a-chip holds tremendous promise.

A tension exists between the advantage of anticipated yet unreached "lower fabrication costs" and the perpetuated disadvantage of a novel technology that is not fully developed. These create a loop of inefficient if not effectively stalled commercial development: As long as lab-on-a-chip remains a novel undeveloped vision motivated by isolated component experiments and no overarching systems framework, mass production and lower fabrication costs remain unreachable, keeping lab-on-chip exotic and inaccessible, effectively maintaining LoC's novelty and underdevelopment.

Figure 1:
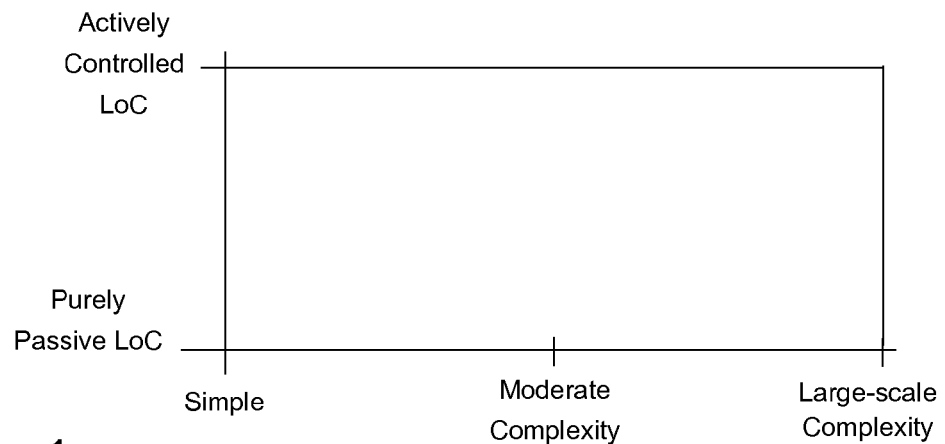
FIG. 1 shows an exemplary two-dimensional attribute space (two-attribute demographic landscape) for LoC devices.

FIG. 1 shows an exemplary two-dimensional attribute landscape for demographically characterizing LoC devices. One attribute of this attribute space relates to systems-level complexity. This attribute is represented by the horizontal axis in FIG. 1. An exemplary metric of systems-level complexity is the total number of primitive elements (by appropriate definition) included in the system. One definition of a primitive element may be a low-level functional component such as a sensor, reactor, pump, valve, etc.

To date, very few LoC devices described include more than a dozen or few dozen primitive elements. Those with 20 or fewer elements may, roughly, be viewed as simple while LoC devices with between 20 to 200 or so primitive elements may be viewed as having moderate complexity. LoC devices with more than 200 or so primitive elements may be viewed as having large-scale complexity. It is contemplated that future LoC devices may have many hundreds, thousands, tens of thousands, or perhaps even significantly higher numbers of primitive elements.

The other attribute of the two-dimensional demographic attribute space of FIG. 1 relates to whether the LoC devices are operationally passive devices or, alternatively, involve active control. The property of active versus passive control is represented by the vertical axis in FIG. 1. Here, active control may include one or more of hardware logic, firmware algorithmic logic, software algorithmic logic, external software control via communication ports, analog feedback control systems, or digital feedback control systems. Active control may be used for process control, configuration management, and (as anticipated by disclosure and other related inventions and technologies) system reconfiguration.

Two approaches for addressing these formidable problems and opportunities include:

Creating a universal framework and software system for development, control, programming, simulation, and emulation of fixed, configurable (and reconfigurable) LoC devices; and Creating a set of standard configurable and/or reconfigurable architectures that will allow a single LoC system to service a wide family of applications.

Described embodiments include those directed to software systems for the specification, development, control, programming, simulation, and emulation of fixed, software-configurable, software-reconfigurable, and software-controlled Lab-on-a-chip ("LoC") devices.

In addition to actually interfacing, controlling, and providing a software-development platform for a wide range of LoC devices, the various embodiments provide for the same specification files and operating scripts to be used across several subsystems. For example, in an embodiment, numerical simulation and physical emulation systems can use the same files and scripts to control simulations and render associated active data visualizations. Another feature relates to the control of software-reconfigurable and software-controlled emulation systems.

Reconfigurable Chemical Processing Systems, Reconfigurable LoC, and LoC Commercialization Economics Currently, despite extensive highly-funded basic research, only a very few "Lab-on-a-Chip" devices are commercially viable. Most of these, however clever in design, are usually quite simplistic in their complexity. This is largely due to the current but long-established research and industry mindset wherein a special dedicated design uniquely serves a particular isolated application area.

This is an unfortunate situation as it creates a network of self-reinforcing self-limiting processes that have long been impeding the industry's effectiveness, value, acceptance, and growth. R&D costs for a full design and subsequent manufacturing costs are very high, typically preventing all but a select few of the simplest devices from reaching manufacture. Further, there is often little opportunity to reuse R&D and manufacturing setups, creating at once both huge opportunity loss and tremendous wasteful industrial process redundancy. The limited manufacturing experience that results diminish chances to improve and refine manufacturing and design techniques, and additionally prevent economies of scale from being leveraged to reduce costs and broaden the possibilities for using "Lab-on-a-chip" technologies.

Figure 3A:
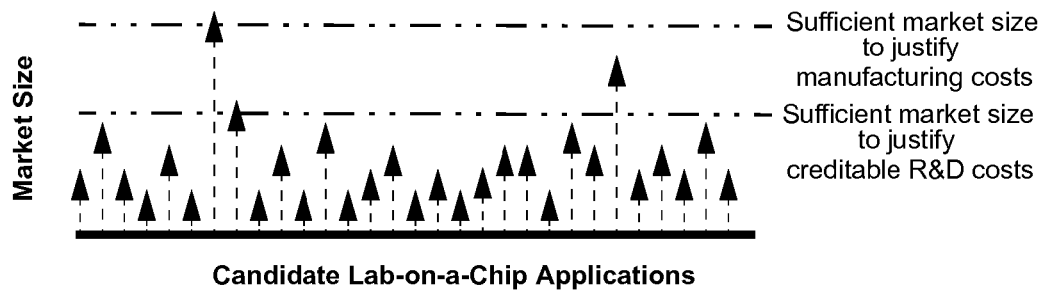
FIG. 3a depicts the situation where with potential candidate applications, very few can demonstrate enough market size to justify sizable R&D and manufacturing costs and risks.

FIG. 3a depicts the situation described above. Of the potential candidate applications that could find practical use or otherwise contribute value (represented by the vertical arrows), very few can demonstrate enough market size to justify sizable R&D costs (represented by the three vertical arrows crossing the lower threshold line). Of these, only a very few are even close to being able to demonstrate enough market size to justify the even more sizable manufacturing costs and risks (represented by the single vertical arrow just barely crossing the upper threshold line).

Figure 3B:
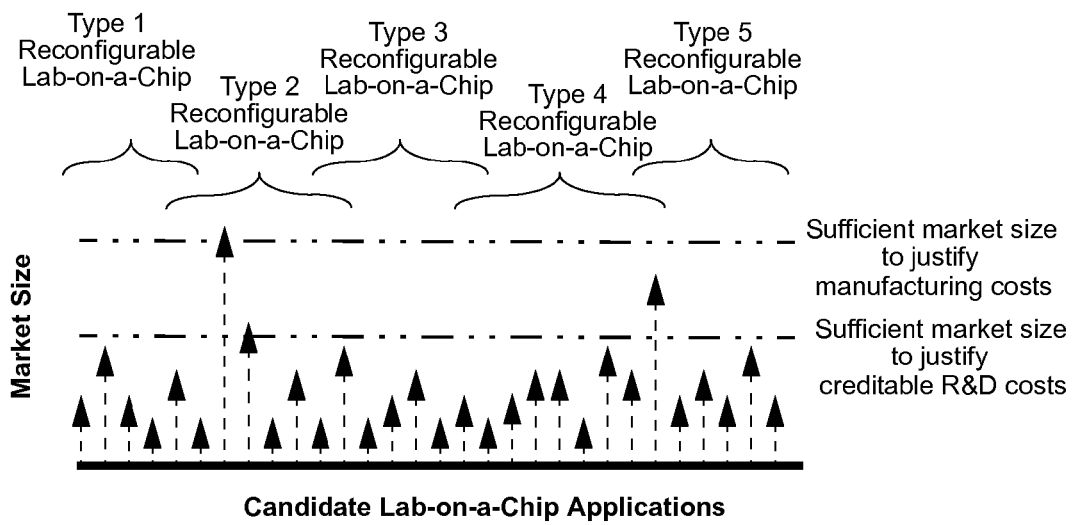
FIG. 3b shows potential candidate applications of FIG. 3a clustered into five such potential reconfigurable LoC products.

Many of the potential candidate applications (represented by the vertical arrows) in FIG. 3a can be served by associated LoC designs that share a significant number of component features and aspects with one another. Of these, at least one group of LoC designs associated with the selected potential candidate applications can be clustered and fitted with controllable element attributes and controllable routing. The resulting "meta-system" can serve as an archetype design for a reconfigurable LoC system. The archetype design can be further enhanced and perhaps broadened to create a potential reconfigurable LoC product that can serve at least the aggregated markets for potential candidate application in the group. FIG. 3b shows the potential candidate applications of FIG. 3a clustered into five such potential reconfigurable LoC products (denoted as Type 1, Type2, Type 3, Type 4, and Type 5). In many cases, the capabilities of the potential reconfigurable LoC products can be broadened enough so that a few of the potential candidate applications could be served by more than one of the potential reconfigurable LoC products. This overlap is represented in FIG. 3b by the overlapping brackets.

Figure 3C:
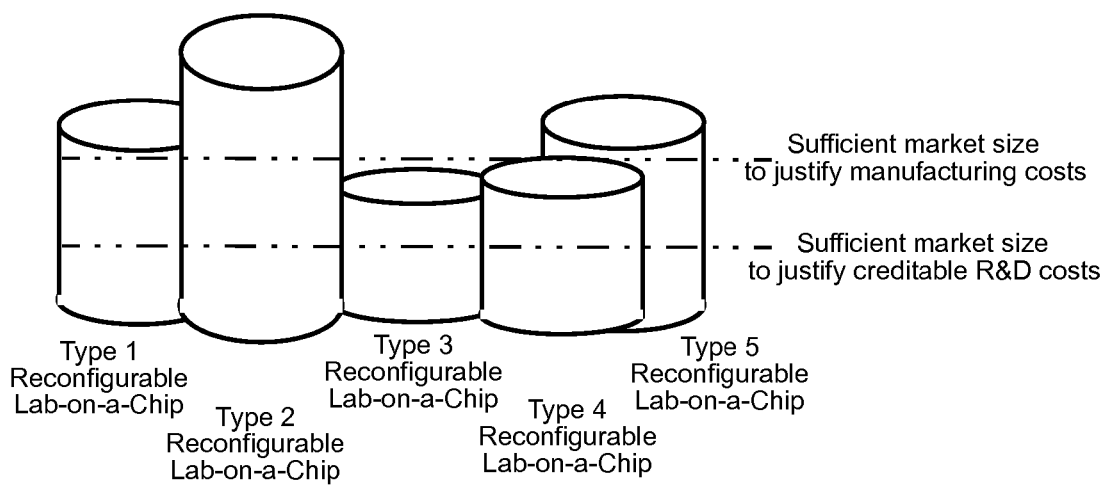
FIG. 3c depicts an example where several potential reconfigurable LoC products immediately demonstrate enough potential market to merit both R&D and manufacturing with others defined to aggregate enough market size to merit at least R&D.

Thus a single reconfigurable LoC product, once manufactured, can serve a large number of small-market applications. FIG. 3c depicts this result. For example, at least the Type 1, Type 2, and Type 5 potential reconfigurable LoC products immediately demonstrate sufficiently large potential markets to merit both R&D and manufacturing. In this example, the Type 3 and Type 4 potential reconfigurable LoC products were defined so as to aggregate at least enough market size to merit R&D, albeit not quite enough market to merit an immediate post R&D manufacturing response.

Figure 3D:
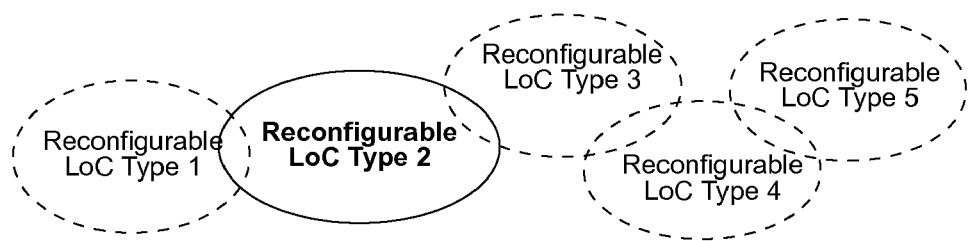
FIGS. 3d-3g depict steps in an exemplary commercialization-enabled scenario demonstrating immense value in pursuing reconfigurable LoC design.
Figure 3E:
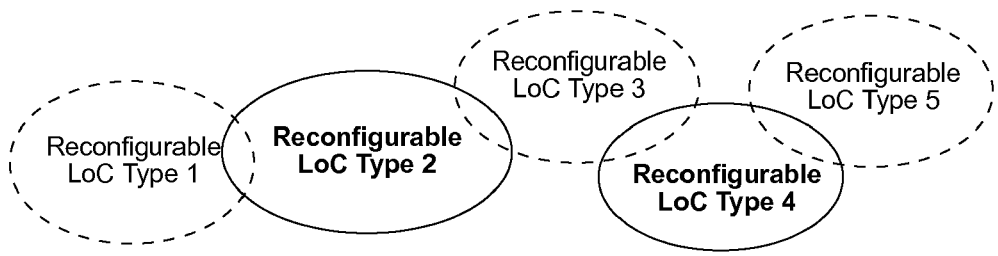

Continuing with the example, various industry and business decisions lead to a first offering of a commercial reconfigurable LoC product—for example of the Type 2 variety—as suggested in FIG. 3d. Based on the market response (good, fair, or bad) and manufacturing lessons learned, desires for shared manufacturing, competitive responses, etc, a second reconfigurable LoC product—for example of the Type 4 variety—is introduced as suggested in FIG. 3e. The Type 4 choice serves an entirely different market sector that the earlier Type 2 product offering.

Figure 3F:
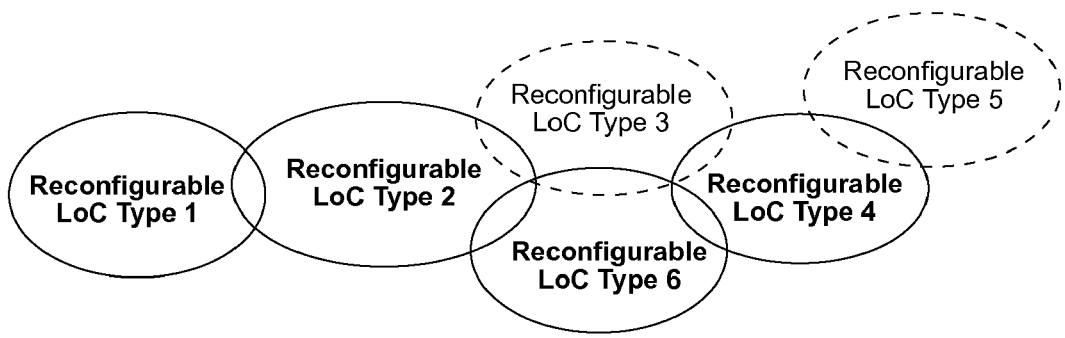

Continuing with the example, there may be market, regulatory, or technical problems that continue to impede Type 3 as originally envisioned, but a competitor may introduce an entirely new Type 6 product that for some applications competes with the now existing Type 2 and Type 4 product offerings. That competitor, another manufacturer entrant, or one of the other manufacturers may also introduce a Type 1 product. This is depicted in FIG. 3f.

Figure 3G:
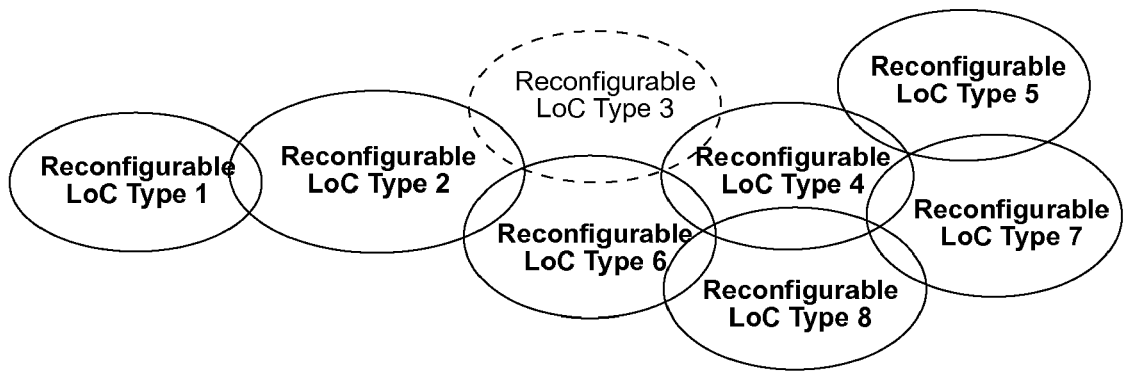

Continuing further with the example, new technology, developing market forces, new applications, and other manufacturer entrants will continue to expand the market. For example, as shown in FIG. 3g, a Type 5 product offering, along with new R&D Type 7 and Type 8 product offerings, are introduced.

Continuing with the example the market is now full of LoC solutions for an ever-expanding list of valuable applications, while only a few manufacturing designs were required (for example, in the example provided here only 7 types of reconfigurable LoC products are manufactured). Further, the mass production encourages a growing skill-base in using these reconfigurable LoC products, putting these 7 reconfigurable LoC in the same role as that of the selection of available microprocessors and embedded controllers in the electronics and computer industry—that is, once available and understood, they become tools for many additional unforeseen applications by a great many more customers.

The exemplary FIGS. 3b-3g scenario demonstrates the immense value in pursuing reconfigurable LoC design. First, the aggregation of application fractured markets made possible by properly designed reconfigurable LoC products breaks the long-standing stalemate depicted in FIG. 3a. Second, not only does a reconfigurable physical chemical process emulation setup provide a development environment with the value spelled out in the discussion of FIG. 2a, but additionally the reconfigurable physical chemical process emulation setup and reconfigurable LoC both inform and cross-enable one another. This rationale provides even more reasons for producing commercial component products, and entire systems, for reconfigurable physical chemical process emulation.

Configurable and Reconfigurable LoC, Clearing and Cleaning, and Further LoC Classifications Attention is now directed to classification remarks concern matters of distinguishing initial configuration, modal operation, and reconfiguration:

In many situations and applications, one or more of instances of one or more setup action may be enacted prior to the operation of the reconfigurable LoC or reconfigurable chemical process emulation system. This enactment establishes an initial configuration of the LoC or emulation system.

In many situations and applications, limited valve operation and other topological actions may be enacted during operation of the reconfigurable LoC or reconfigurable chemical process emulation system. These enactments may be viewed as modal operation within a previously established initial configuration.

In some situations and applications, significant variations or fundamental structural changes are enacted; these may be viewed as a reconfiguration of the associated larger system.

In some embodiments and applications, portions of a reconfigurable LoC or reconfigurable chemical process emulation system may be designated for single substance-type use, single-purpose use, or even single-event use. In other embodiments and applications, at least portions of a reconfigurable LoC or reconfigurable chemical process emulation system may provide for some form of clearing and cleaning of at least some portions the reconfigurable LoC between at least some operations so as to allow buses, valves, and in many cases connected devices to be reused with limited contamination. These clearing and cleaning operations can deliver several benefits:

Permit multiple reuse of the LoC within a larger system (for example a mass-produced consumer-level food-toxin tester);

Removal of toxins prior to recycling or disposal;

Recovery of valuable reagents prior to recycling or disposal.

Figure 4:
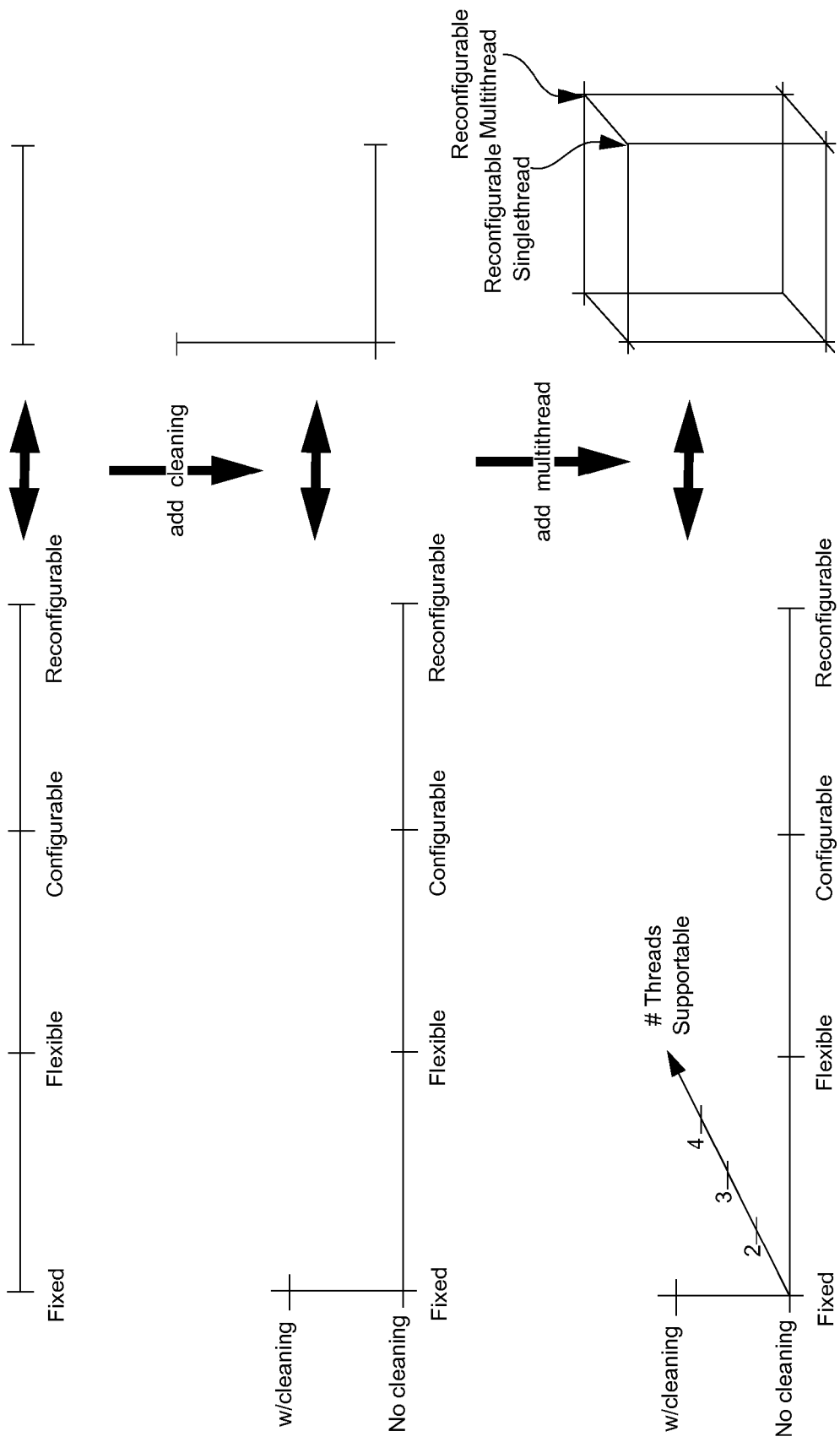
FIG. 4 shows the construction of another attribute space relevant to the inclusion of reconfigurable LoC devices and emulation systems emulating LoC devices.

Earlier, FIG. 1 provided an exemplary two-dimensional attribute space for demographically defining LoC devices. The two attributes defining the two-dimensional attribute space of FIG. 1 are metrics of complexity and of passivity versus active control employed by the LoC. In view of the additional considerations raised thus far, FIG. 4 shows the construction of another attribute space relevant to the inclusion of reconfigurable LoC devices and emulation systems emulating LoC devices. In this:

The first attribute is an index relating to whether an LoC device or LoC emulation system has a fixed configuration, some degree of primitive flexibility in its configuration, a (software or other electrical) "configurable" (i.e., controllable) configuration, or a reconfigurable configuration that may be changed within the actual operation time of the system.

An added second attribute pertaining to whether the LoC device or LoC emulation system comprises internal clearing and cleaning capabilities.

An added third attribute pertaining to the number of simultaneous independent processing "threads" or activities that can be simultaneously supported. This is analogous to the number of simultaneous real-time control threads that may be supported by a real-time microprocessor or Digital Signal Processing (DSP) chip.

Integrating a Plurality of Specification, Simulation, Emulation, Visualization, Fabrication Design, and Control Software Development Systems into a Common Interactive Environment with Exchanged Data Clearly as LoC devices progress from designs of moderate complexity to designs of larger and large-scale complexity, design tools will be needed. The needs amplify when active control is added, and yet again when reconfiguration is added. Applicable design tools could include, among others:

A specification system, potentially including an interactive graphical interface;

A fabrication design system, potentially including an interactive graphical interface;

An active data visualization system;

A graphical layout and rendering system, potentially used to provide graphical renderings for one or more of the above three systems;

A numerical simulation system;

A software reconfigurable physical emulation system;

A control software development system.

Figure 5:
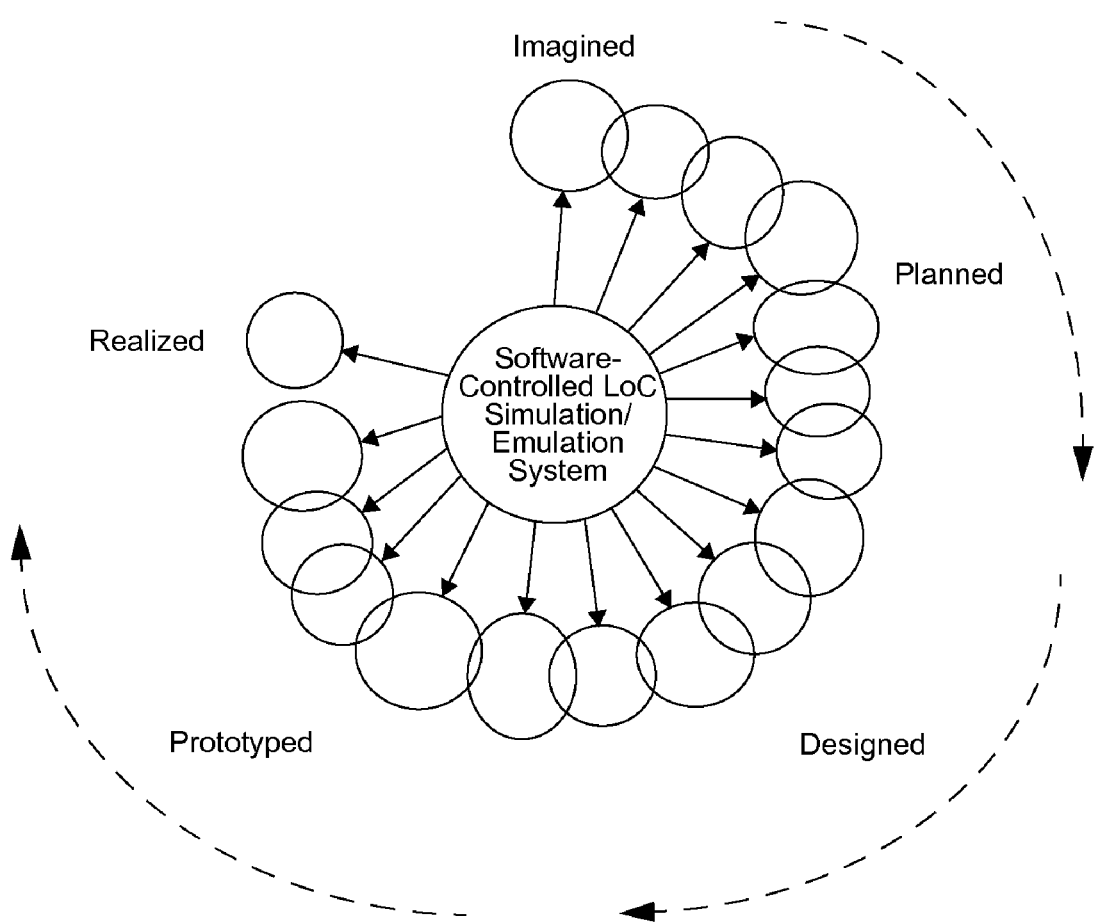
FIG. 5 shows a software-controlled reconfigurable LoC emulation system that can be used to emulate a wide range of differing imagined, planned, designed, prototyped, and/or realized LoC devices.

FIG. 5 shows an integrated software-controlled LoC simulation/emulation system that can be used to emulate a wide range of differing imagined, planned, designed, prototyped, and/or realized LoC devices. As such, the reconfigurable LoC emulation system can potentially provide value throughout virtually the entire research, development, design, prototype, and pre-manufacturing cycle of a LoC or reconfigurable LoC product.

Further value can result by integrating together a specification system, numerical simulation system, a software-controlled reconfigurable LoC emulation system, and active data visualization system, with a control software development system and other design tools in a common environment. Exemplary methods and systems for this which are applicable to the present disclosure are provided in, for example, U.S. patent application Ser. No. 11/946,678 filed Nov. 28, 2007. Here, a few additional examples are provided that may be advantageous in various embodiments, implementations, and applications.

Figure 6A:
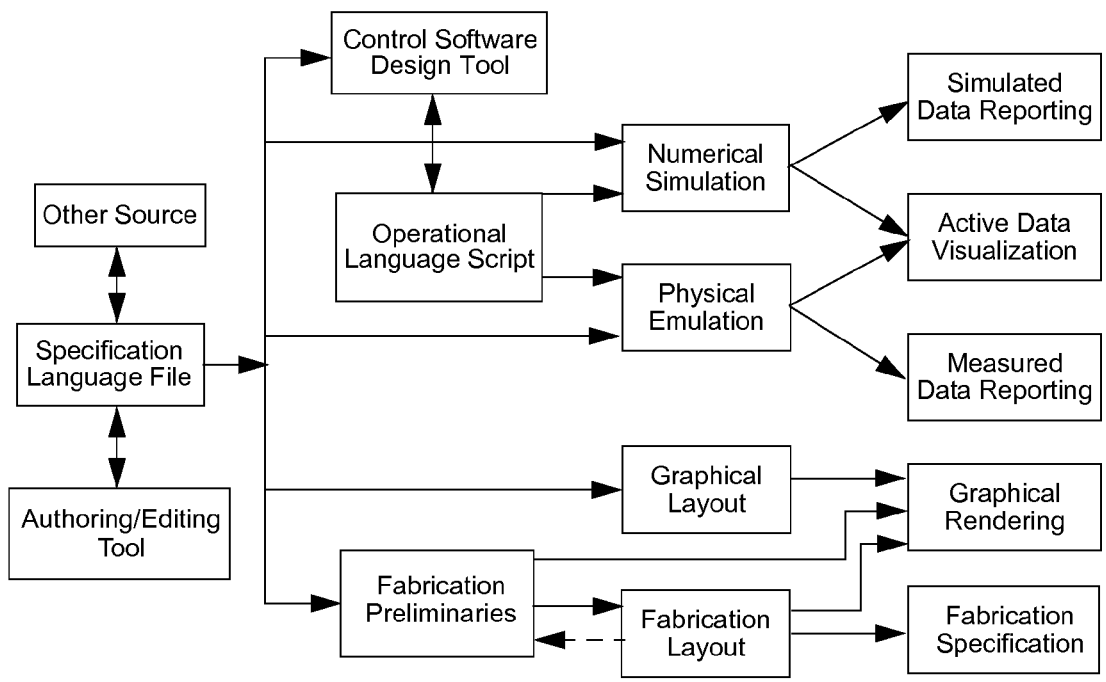
FIGS. 6a-6b show exemplary overviews of the functional elements of an embodiment of the invention.

FIG. 6a depicts an exemplary integrated system integrating a specification system, a fabrication design system, a graphical layout system, a graphical rendering system, a numerical simulation system, a software-controlled reconfigurable LoC physical emulation system, an active data visualization system, and a control software development system. This exemplary arrangement provides for the same specification file(s) to be used for defining a common underlying design model to the graphical layout system, the numerical simulation system, the software-controlled reconfigurable LoC physical emulation system, the fabrication design system, and the control software development system. These specification files may be created and/or provided from an authoring/editing tool or an outside source. These files may be stored in a file system or database. The files may be tagged with descriptive metadata, associated with pointers to descriptive metadata, or otherwise linked to descriptive metadata to facilitate searches by feature, searches by usage, versioning control, etc.

The exemplary integrated system of FIG. 6a also provides for operational language scripts to be created and modified by a control-software design tool. Although not shown in FIG. 6a, these operational language scripts may also be provided by an outside source. These files may be stored in a file system or database. The files may be tagged with descriptive metadata, associated with pointers to descriptive metadata, or otherwise linked to descriptive metadata so as to facilitate searches by feature, searches by usage, versioning control, etc. For example, each operational language script may be associated with a particular individual or family of specification files.

The exemplary integrated system of FIG. 6a provides for the graphical layout element to produce layout data, such as a draw list, that is then presented to a graphical rendering element that converts this information into a visual graphic for rendering on a display. In some embodiments the rendering is such that text and graphics may be subsequently overlaid on the rendered visual graphics. In some embodiments the graphical layout element may provide interactive features—in some embodiments doing so in conjunction with the graphical rendering element—so as to provide the user layout choices, options, and alternatives. The graphical layout element and graphical rendering element each may produce and use associated files. These files may also be provided by an outside source. These files may be stored in a file system or database. The files may be tagged with descriptive metadata, associated with pointers to descriptive metadata, or otherwise linked to descriptive metadata so as to facilitate searches by feature, searches by usage, versioning control, etc. For example, each file may be associated with a particular individual or family of specification files.

The exemplary integrated system of FIG. 6a provides for a given operational language script to be used by the numerical simulation system and/or the software-controlled reconfigurable physical emulation system. The numerical simulation system produces simulation data in real time or at the end of a simulation. This simulated data may be reported in standard formats or be directed to the active data visualization system. The active data visualization system, for example, may indicate simulated data in intricate analytical formats, employ visual metaphors, and/or superimpose simulated data results on graphical depictions of the modeled system described by the specification file. Similarly, the software-controlled reconfigurable physical emulation system produces measured data in real time or at the end of an emulation time interval. This measured data may be reported in standard formats or be directed to the same active data visualization system. The active data visualization system, for example, may indicate measured data in intricate analytical formats, employ visual metaphors, and/or superimpose simulated data results on graphical depictions of the modeled system described by the specification file. In some embodiments, the measured data may be converted by various linear and non-linear conversions to impose mappings that may be useful in associated measured data from the physical emulation system to the physical scale or other variations of the modeled underlying LoC design defined by the specification file(s). In some embodiments, the active data visualization system may co-display or provide a mixed display of current or previous simulation(s) and/or emulation(s).

The exemplary fabrication design system of the exemplary integrated system of FIG. 6a may include an element for computing various fabrication preliminaries based on an underlying fabrication process template or method library. The fabrication modeled in the fabrication preliminaries element may include photolithography, metallization, micromachining, ion implantation, laser etching, controlled self-assembly via chemical-process or physical-process, etc. Based on the result of operations on the specification file produced by the fabrication preliminaries element, a fabrication layout is produced by a fabrication layout element. In some embodiments, the fabrication layout element and fabrication preliminaries element may iteratively interact. In some embodiments, the fabrication layout element may provide data to the graphic rendering element discussed above. The fabrication preliminaries element and fabrication layout element each may produce and use associated files. These files may also be provided by an outside source. These files may be stored in a file system or database. The files may be tagged with descriptive metadata, associated with pointers to descriptive metadata, or otherwise linked to descriptive metadata so as to facilitate searches by feature, searches by usage, versioning control, etc. For example, each operational language script may be associated with a particular individual or family of specification files.

Figure 6B:
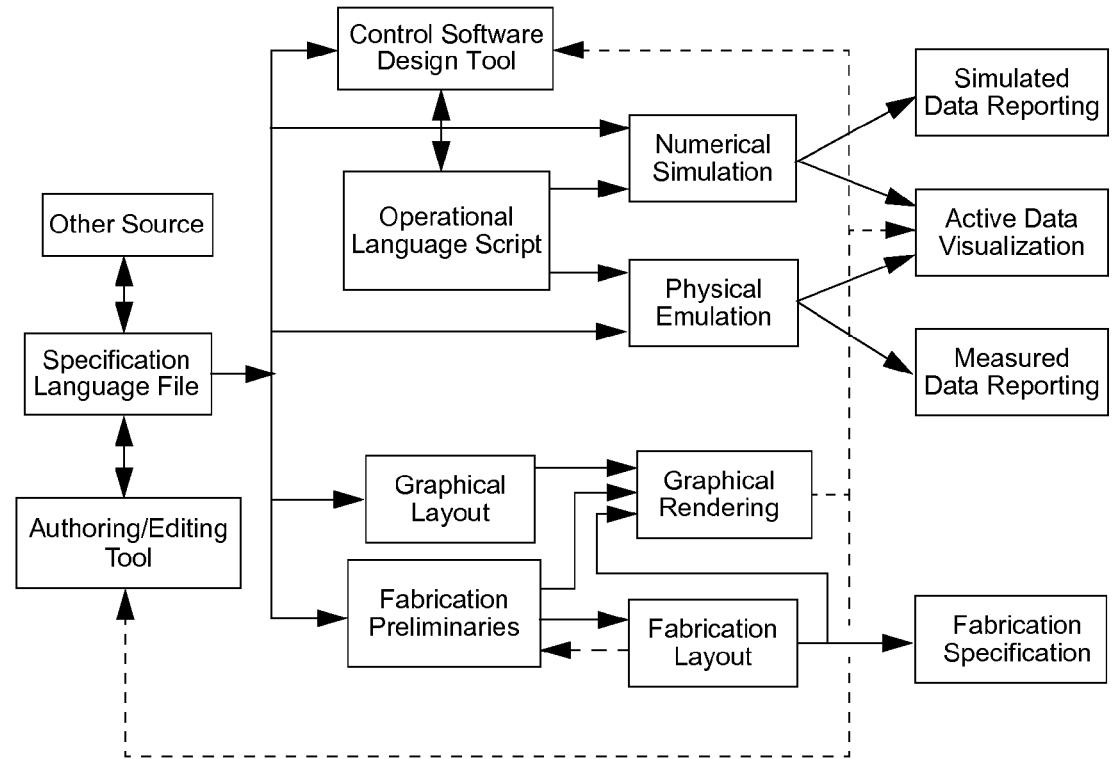

FIG. 6b depicts an exemplary variation on the exemplary integrated system of FIG. 6a. In this variation, the graphic rendering element may supply graphics and, in some embodiments, otherwise interact with one or more of the authoring/editing tool, the active data visualization tool, and/or the control software design tool. Other approaches are possible as is clear to one skilled in the art. For example, the graphic rending element may provide more complex services or functions to other elements in the system.

Figure 7A:
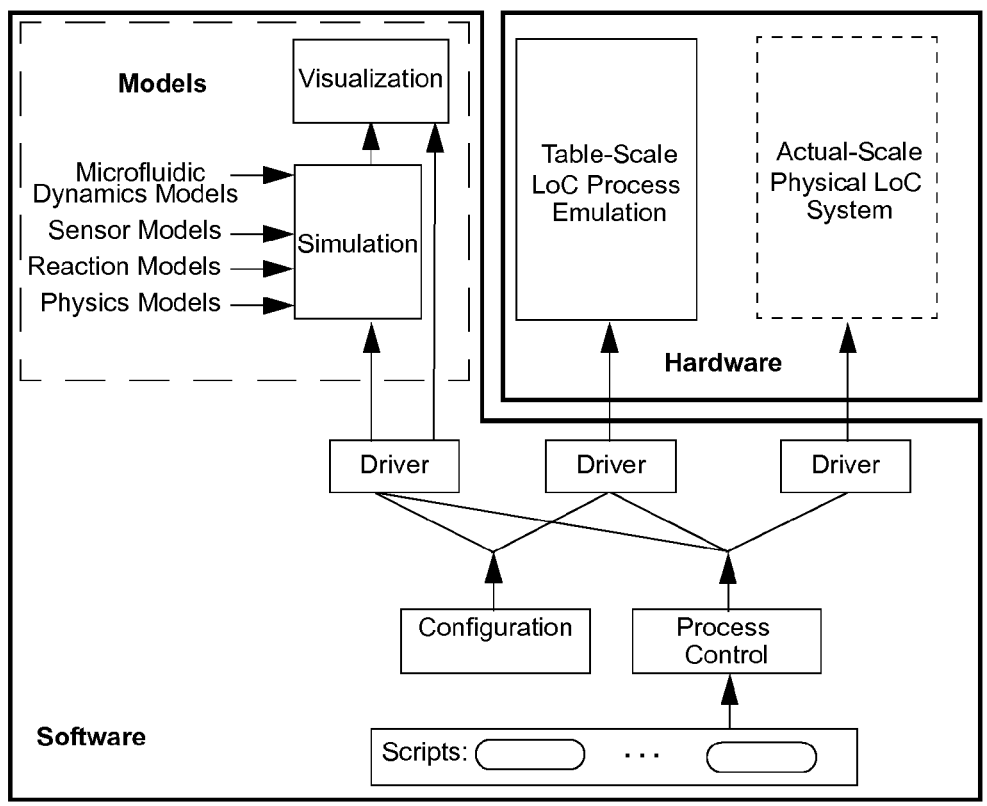
FIG. 7a shows a global view of an integrated system for simulation, emulation, and in some applications direct control of a fixed-design LoC device from one or more common scripts and/or files.

FIG. 7a shows a global view of an exemplary software environment embodiment of an integrated system such as that of FIG. 6a or FIG. 6b. This exemplary embodiment is directed to the development, study, or operation of LoC devices which do not have controllable configuration or reconfiguration abilities. The integrated system may be used for progressive and/or interspersed simulation, emulation, and, where applicable, direct control of an LoC device from one or more common scripts and/or files.

In the exemplary software environment embodiment of FIG. 7a, the same scripts and/or files operate a process control element in communication with various target-specific drivers. Here one such driver is associated with a numerical LoC modeling system having a simulation component and a visualization component in addition to other detail numerical models. Another such driver in this embodiment is associated with a "table-scale" or other LoC emulation system. Another such driver in this embodiment could be provided to interface with an actual or prototype controllable LoC device should that exist and be available. This allows for the actual or prototype controllable LoC device to be operated by the system and compared with simulation and/or emulation results. Other approaches are possible as is clear to one skilled in the art.

Additionally, the exemplary software environment embodiment of FIG. 7a would typically include numerical simulation and emulation systems that are configurable or reconfigurable. Other approaches are possible as is clear to one skilled in the art.

Figure 7B:
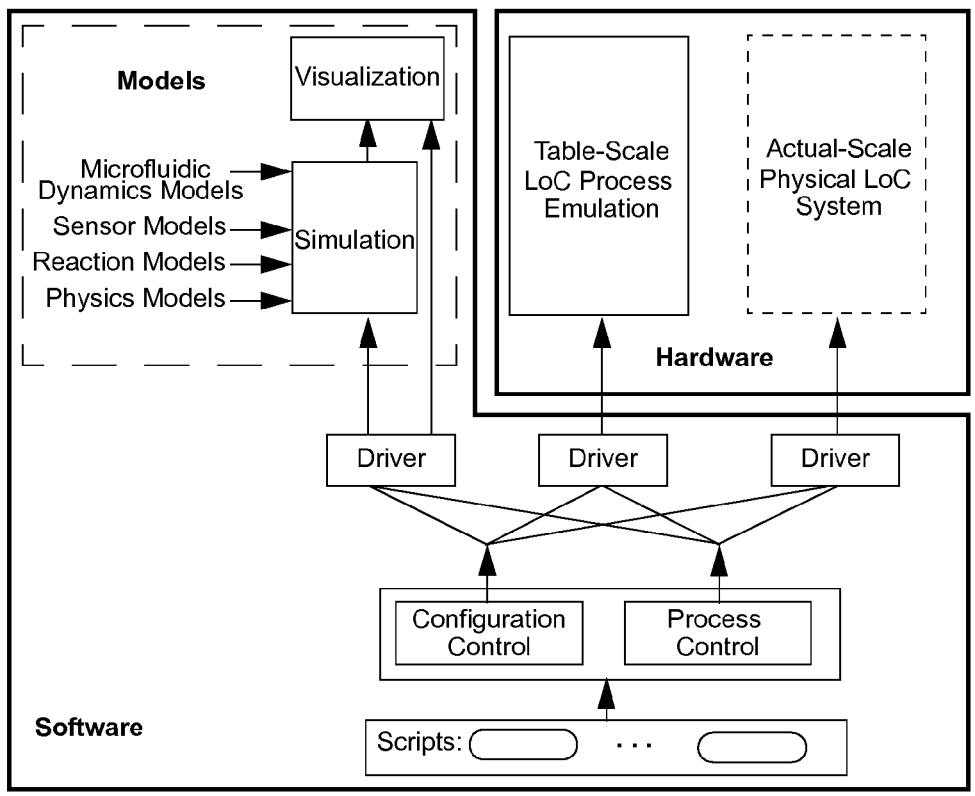
FIG. 7b shows a global view of an integrated system for simulation, emulation, and in some applications direct control of a configurable or reconfigurable LoC device from one or more common scripts and/or files.

FIG. 7b shows an exemplary adaptation of the exemplary software environment embodiment of FIG. 7a where the actual LoC device under development, study, or operation has configuration or reconfiguration abilities. In this case, common configuration scripts and/or files and/or other techniques are used to configure the numerical simulation system, the physical emulation system, and the LoC device itself should it exist and be available. The same configuration scripts and/or files and/or other means are used to configure the numerical LoC modeling system and the LoC emulation system. Further, it may be especially advantageous to integrate configuration control together with process control as shown in FIG. 7b. In this way scripts and/or files may combine configuration commands and process commands. As with the exemplary embodiment of FIG. 7a, the exemplary embodiment of FIG. 7b can also include provisions to interface with an actual or prototype controllable LoC device, should that exist and be available. This allows for the actual or prototype controllable LoC device to be operated by the system and compared with simulation and/or emulation results. Other approaches are possible as is clear to one skilled in the art.

Specification System

The integrated systems of FIGS. 6a and 6b, as well as a wide range of variations that are clear to one skilled in the art and thus provided for herein, includes a specification system for describing LoC models with specification files. These specification files comprise lists of elements, attributes of these elements, a list of interconnections among chemical ports of the elements, and a list of interconnections among signal ports of the elements. The specification files may also include additional information such as ports to other systems, descriptive information, etc.

The specification system may include an authoring/editing system such as that depicted in FIGS. 6a-6b. In one family of embodiments, specification files may be created or edited through use of an interactive graphical user interface. In some of these embodiments, the interactive graphical user interface may provide graphical depictions of the elements and their interconnection.

Figure 8A:
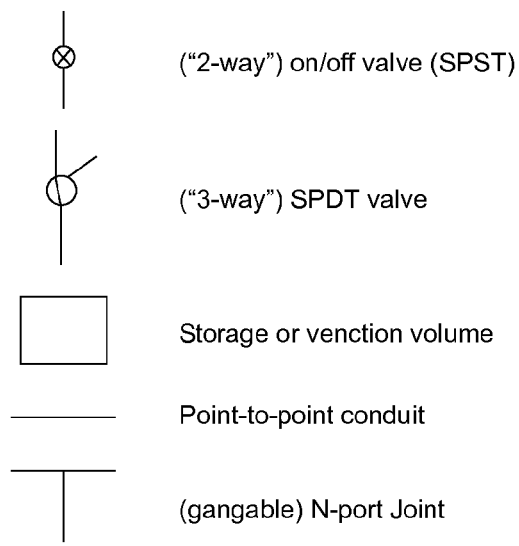
FIG. 8a depicts exemplary primitive elements that may be used in the design of larger chemical process systems as may be used in lab-on-a-chip devices.

FIG. 8a depicts a short exemplary collection of primitive elements that may be used in the design of larger chemical process systems as may be used in lab-on-a-chip devices. In some embodiments, this collection can be large. If desired, the elements within this collection can be modified and/or extended by adding new elements. Other approaches are possible as is clear to one skilled in the art.

Figure 8B:
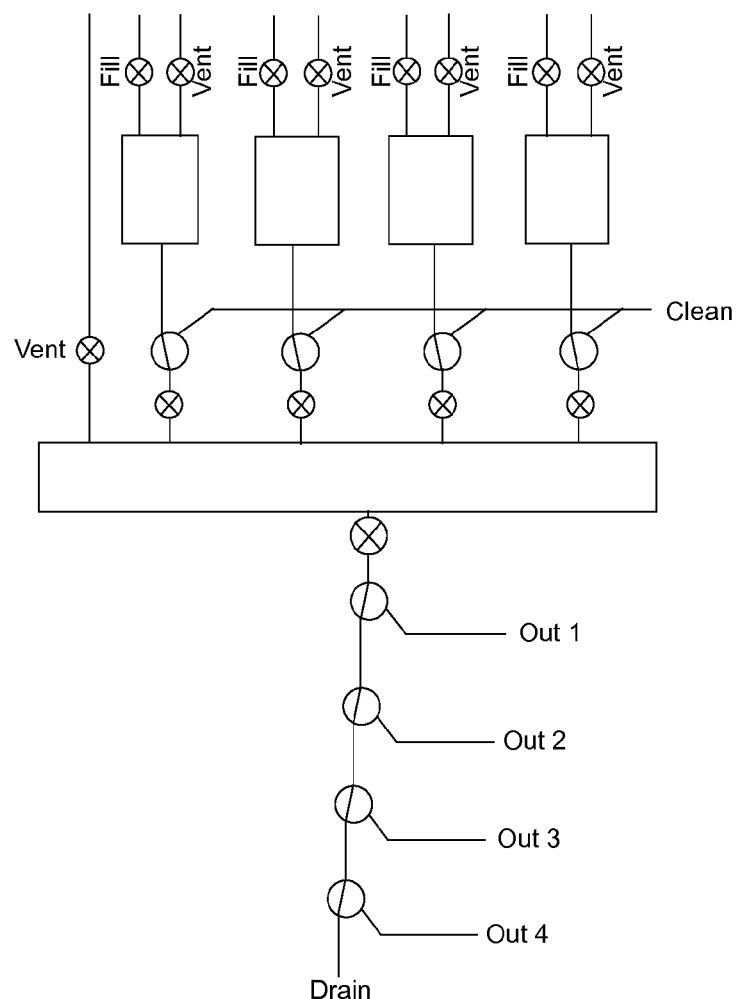
FIG. 8b depicts an exemplary subsystem design that may be assembled from the exemplary primitive elements of FIG. 8a such as may be used in the design of a larger chemical process systems as may be used in lab-on-a-chip devices.
Figure 9C:
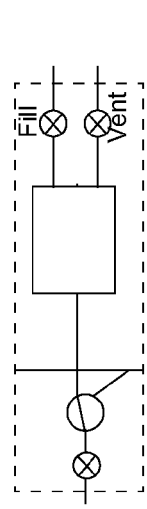
Figure 9C:
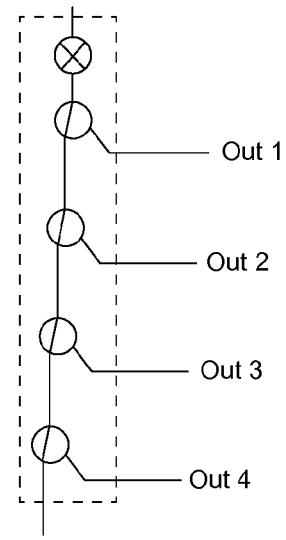
Figure 9C:
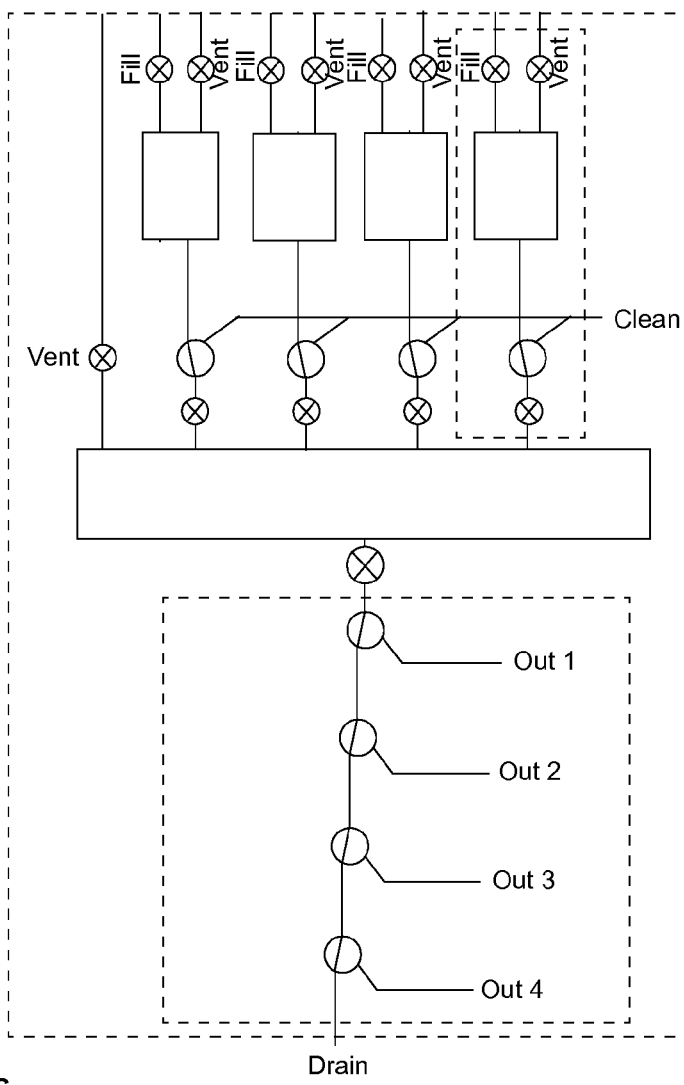

FIG. 8b depicts an exemplary subsystem design that may be assembled from the exemplary primitive elements of FIG. 8a such as may be used in the design of a larger chemical process systems as may be used in lab-on-a-chip devices. FIGS. 9a-9c provide one example of how the exemplary subsystem design of FIG. 8b may be constructed in steps from the exemplary primitive elements of FIG. 8a to assemble larger subassembly designs, and using these and copies of them to assemble the FIG. 8b subsystem design.

FIG. 9a depicts a first grouping of elements that may be used in building a larger assembly or subassembly of elements. In an embodiment, instances of the primitive elements involved are allowed to be created. Each instance is given one or more attributes (for example type, volume characteristics, number of ports, port geometry attributes, admissible tolerances, etc.). Ports on the element instances can be interconnected, for example by "rubber-band" drawing interfaces, port selection using an interactive graphical user interface, text specification, etc. In a similar fashion, FIG. 9b depicts a second grouping of elements that may be used in building a larger assembly or subassembly of elements. In some embodiments, these groupings may be retained in a library for use in future design sessions or projects. If desired, these groupings may be copied and replicated. In some embodiments, the rendered copies may be individually edited to change attributes of one or more elements, interconnections, etc.

The groups and rendered copies of them may be used to build larger subassemblies, assemblies, subsystems, and systems, up to the scale of a full LoC design. As an example, FIG. 9c depicts a rendering of the exemplary subsystem design of FIG. 8b as built from four instances of the grouping of FIG. 9a, one instance of the grouping of FIG. 9b, some additional primitive elements depicted in FIG. 8a, and some exemplary overlay port and function definitions. The resulting design can be changed, and used as is or as modified. In some embodiments, the resulting design depicted in FIG. 9c may be retained in a library for use in future design sessions or projects.

Figure 10A:
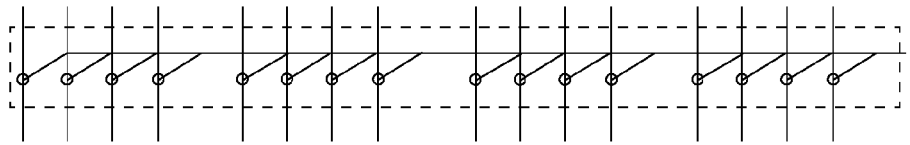
FIG. 10a depicts a subassembly design that may be constructed from exemplary primitive elements of FIG. 8a and that may be used in constructing designs for larger subassemblies and subsystems.

Similarly, FIG. 10a depicts a subassembly design that may be constructed from exemplary primitive elements of FIG. 8a and that may be used in constructing designs for larger subassemblies and subsystems. The resulting design can be changed, and used as is or as modified. In some embodiments, the resulting design may be retained in a library for use in future design sessions or projects.

Figure 10B:
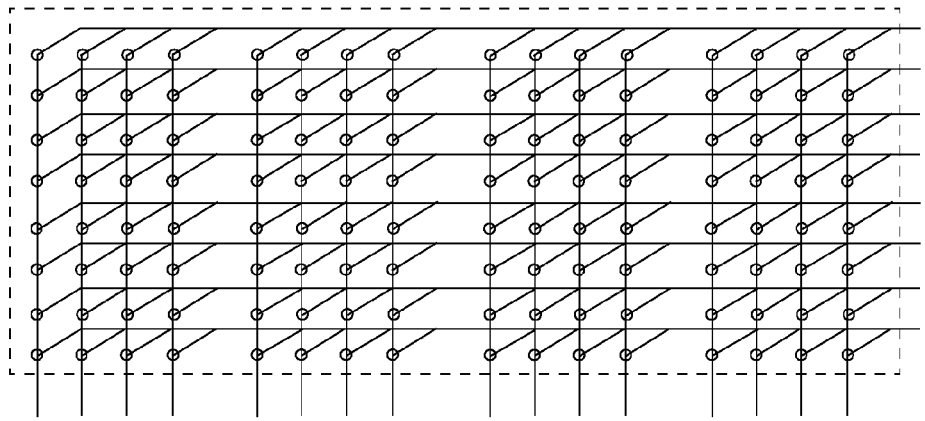

FIG. 10b depicts a multi-channel chemical delivery bus design that may be constructed from multiple copies of the subassembly of FIG. 10a. The subassembly of FIG. 10a may have been just created or may have been recalled from a library of stored designs.

Figure 11:
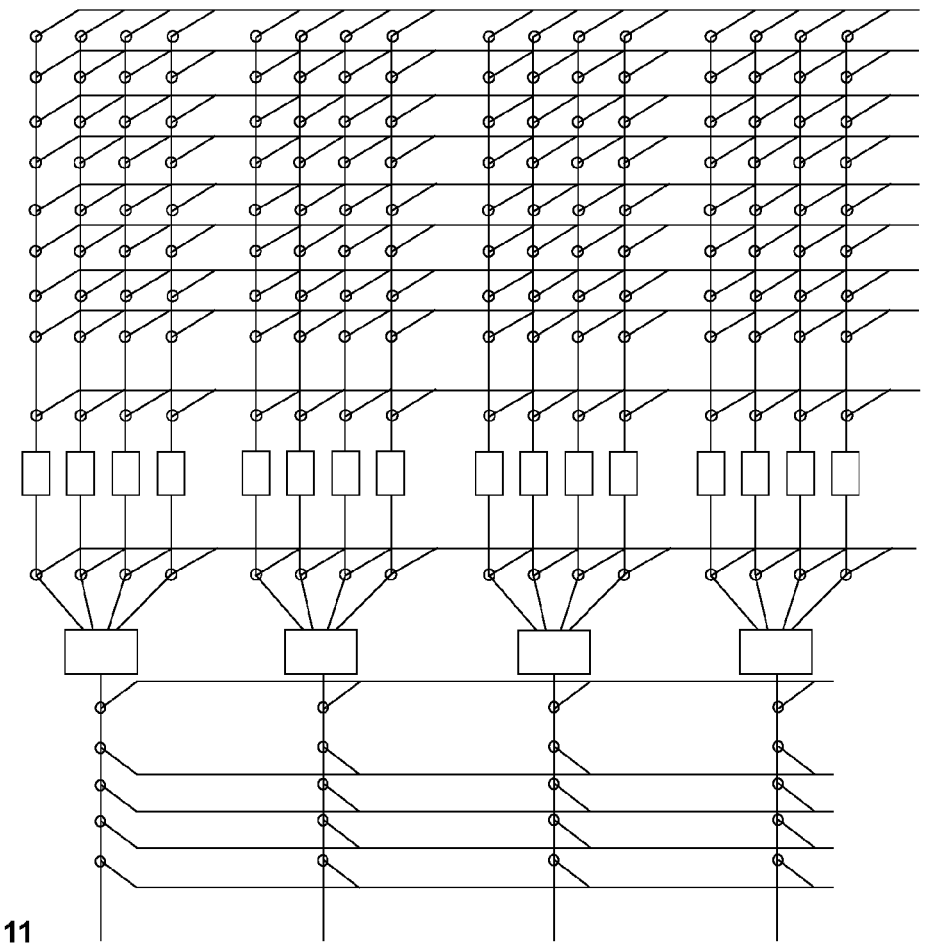
FIG. 11 depicts an exemplary reconfigurable lab-on-a-chip system design that may be constructed from an instance of the design of FIG. 10a, an instance of the design of FIG. 10a, and multiple instances of a modified version of the subassembly of FIG. 9c.

FIG. 11 depicts an exemplary full-scale reconfigurable lab-on-a-chip system design that may be constructed from an instance of the design of FIG. 10a, an instance of the design of FIG. 10a, and multiple instances of a modified version of the subassembly of FIG. 9c. In this example, the modification of the subassembly of FIG. 9c involves replacing the two-port and two-valve fill and vent system for storage vessels in the subassembly of FIG. 9c with a single port that can be interfaced to a designated port on an instance of the subassembly design of FIG. 10a.

Graphical Layout System

The exemplary integrated systems of FIGS. 6a and 6b, as well as a wide range of variations that are clear to one skilled in the art and thus provided herein, include a graphical layout system. A wide range of graphical layout systems are possible, as is clear to one skilled in the art. Examples are known in the industry. Uses and roles of the graphical layout were described earlier in the discussion of the exemplary integrated systems of FIGS. 6a and 6b. Various implementations of graphical layout systems in embodiments of the exemplary integrated systems of FIGS. 6a and 6b are also possible. In some cases, interfaces to external graphical layout systems are also provided.

Figure 12:
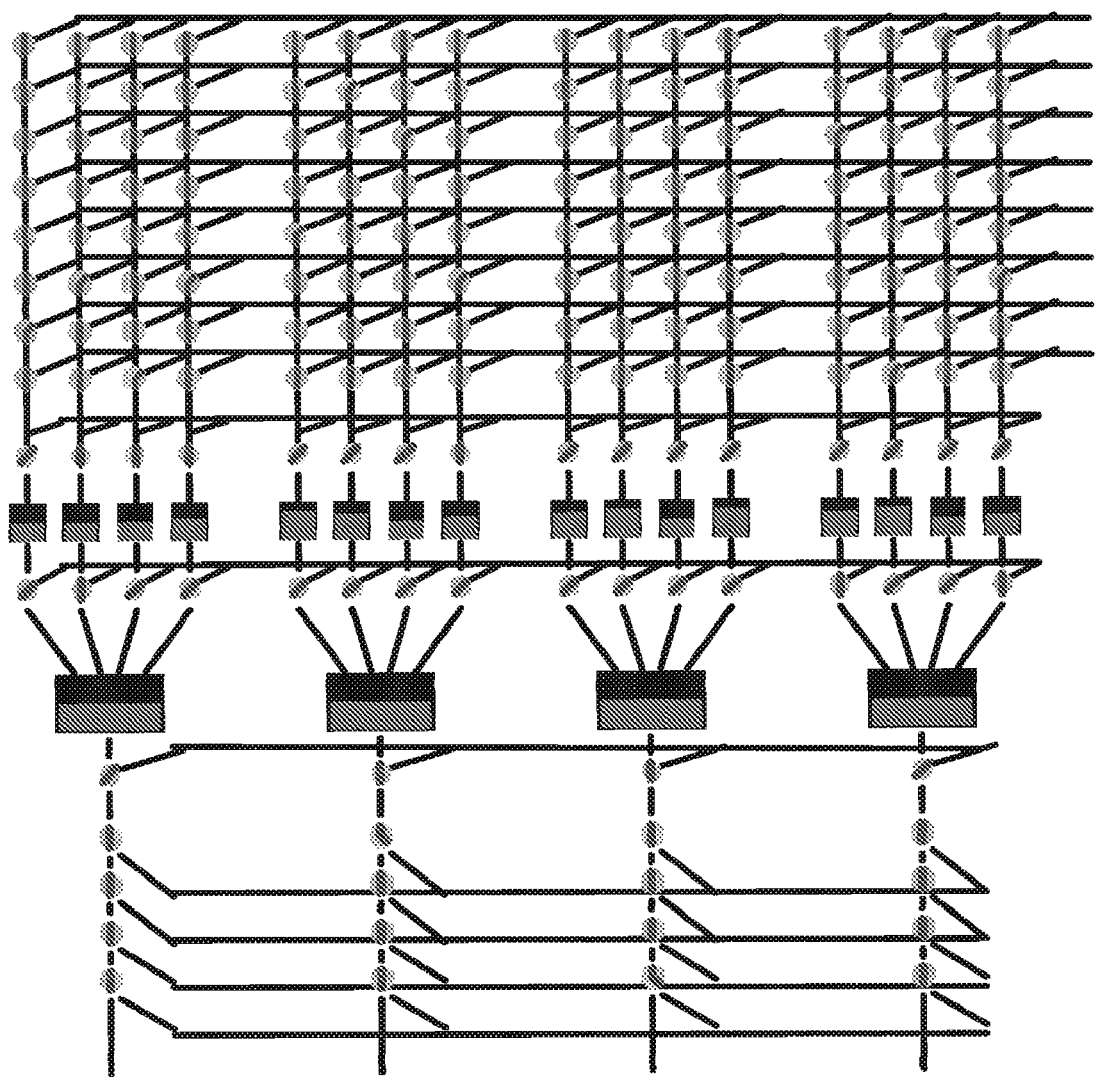
FIG. 12 depicts a graphical layout as may be used in fabrication design and/or an animated visualization of a simulated or emulated operation of the design of FIG. 11.

FIG. 12 depicts a visual rendering of a graphical layout as may be produced by a graphical layout system of the design of FIG. 11. Such a visual rendering of a graphical layout may be used in fabrication design and/or an animated visualization of a simulated or emulated operation of the design of FIG. 11.

Fabrication System

The exemplary integrated systems of FIGS. 6a and 6b, as well as a wide range of variations that are clear to one skilled in the art, include a fabrication design system. A wide range of fabrication design systems are possible, as is clear to one skilled in the art. Examples are known in the industry. Two exemplary fabrication design system arrangements and variations were described earlier in the discussion of the exemplary integrated systems of FIGS. 6a and 6b. Various embodiments of the invention provide for various implementations of fabrication design systems in embodiments of the exemplary integrated systems of FIGS. 6a and 6b. The disclosure also provides for interfaces to external fabrication design systems.

Numerical Simulation System

The exemplary integrated systems of FIGS. 6a and 6b, as well as a wide range of variations that are clear to one skilled, include a numerical simulation system. A wide range of numerical simulation systems are possible, as is clear to one skilled in the art. Examples are known in the industry. Exemplary numerical simulation system arrangements and variations were described earlier in the discussion of the exemplary integrated systems of FIGS. 6a-6b and FIGS. 7a-7b. For example, as depicted in FIGS. 7a-7b, the numerical simulation system may include a number of models that may be created, stored, and retrieved from libraries of associated models. This may include models of microfluidic dynamics, sensor models, reaction models, physics models, etc. Various implementations of numerical simulation systems in embodiments of the exemplary integrated systems of FIGS. 6a and 6b are also possible. The disclosure also provides for interfaces to numerical simulation systems.

Animated Data Visualization System

The exemplary integrated systems of FIGS. 6a and 6b, as well as a wide range of variations that are clear to one skilled in the art, includes a animated data visualization system. A wide range of animated data visualization systems are possible, as is clear to one skilled in the art. Examples are known in the industry. Exemplary animated data visualization system arrangements and variations were described earlier in the discussion of the exemplary integrated systems of FIGS. 6a-6b and FIGS. 7a-7b. The disclosure provides for various implementations of animated data visualization systems in embodiments of the exemplary integrated systems of FIGS. 6a and 6b. Interfaces to external animated data visualization systems are also possible. FIG. 12 depicts a visual output as may be provided by an animated data visualization of a simulated or emulated operation of the design of FIG. 11.

Control Software Development System and Exemplary LoC Software Architectures

As is clear to one skilled in the art, many possible software architectures can be employed for actively controlled LoCs, reconfigurable LoCs, and LoC emulation systems, and more general reconfigurable chemical processing systems. Here, a few examples are provided that may be advantageous in various embodiments, implementations, and applications.

For a number of reasons, a hierarchical design structure is desirable. Some of these are spelled out in the discussion to follow. Additionally, the hierarchical arrangements allow control algorithms to be paired with component groupings, subassemblies, assemblies, subsystems, systems, etc. as described earlier. The resulting designs can be changed, and used as is or as modified. In some embodiments, the resulting design may be retained in a library for use in future design sessions or projects.

Figure 13:
FIG. 13 shows a high-level view of an exemplary software architecture wherein a higher-level control system controls any one or more of a target actual, emulated, or simulated system.

FIG. 13 shows a high-level view of such an exemplary software architecture where a higher-level control system controls any one or more of a target actual (physical), emulated (physical) or simulated (numerical model) system. The target physical or simulated system may include one or more of at least one LoC device, a software-controlled LoC emulation system, and a numerical simulation of some or all components of a LoC device.

Figure 14:
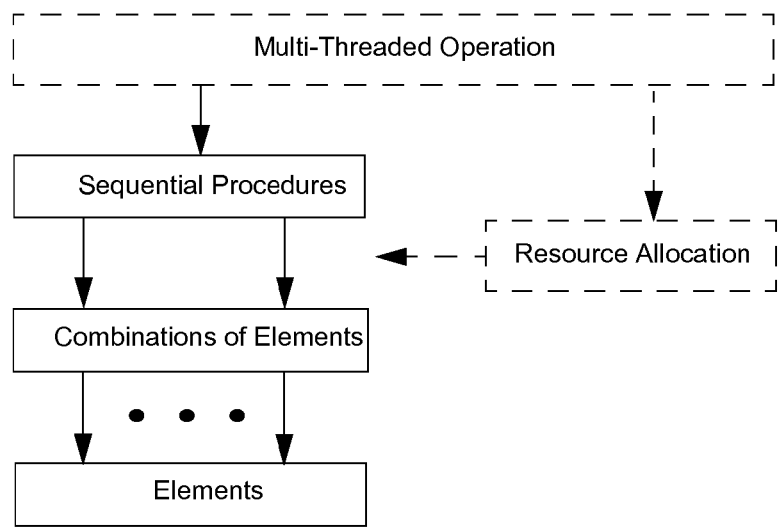
FIG. 14 shows an exemplary control hierarchy of such an exemplary software architecture.

FIG. 14 shows an exemplary control hierarchy of such an exemplary software architecture. At the lowest level are primitive elements such as valves, heaters, motors, electrodes, optical devices, etc. At the next level are combinations of these that may be addressed together to invoke a particular mode or posture of operation. At the next level are sequences of these that may be used to invoke and/or control a temporal process or other more complex operation.

Figure 15:
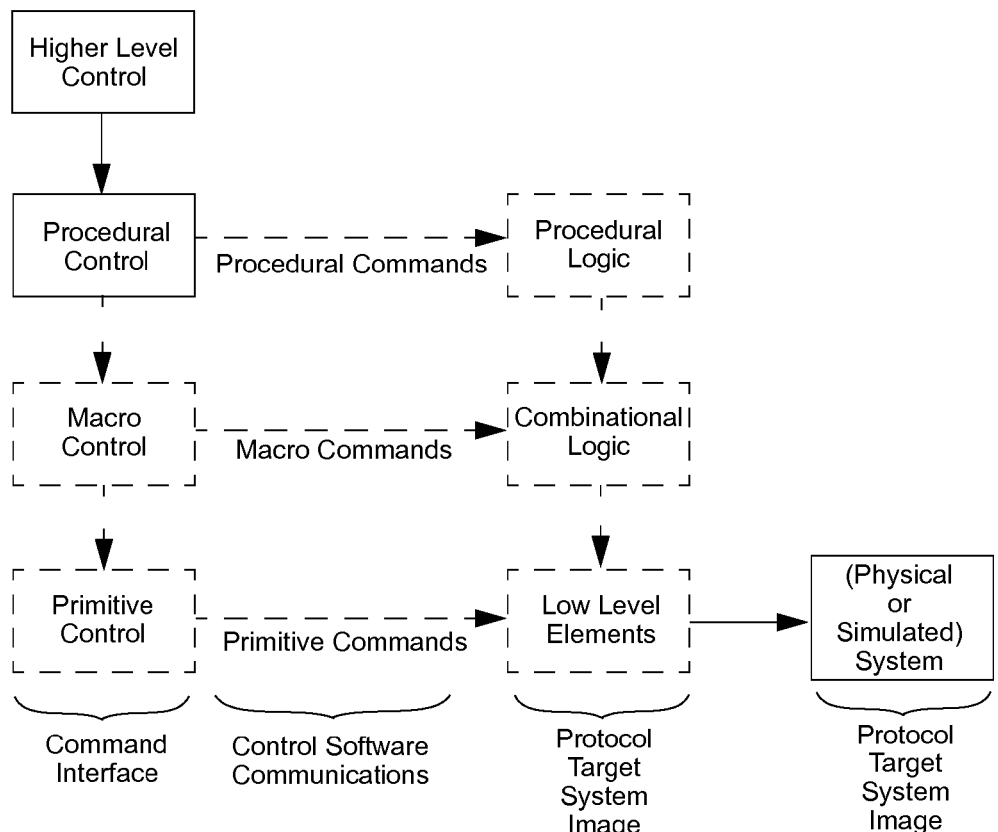
FIG. 15 shows an exemplary transactional organization for an exemplary hierarchy of control.

FIG. 15 shows an exemplary transactional organization for an exemplary hierarchy of control. This hierarchy of control may include a control system (left column), an exemplary hierarchy of control that may be comprised by an LoC device, LoC emulation system, LoC simulation, etc. (right column) which ultimately control the target system (LoC device, emulation, simulation, etc.), and an exemplary hierarchy of commands that may be used to communicate between two hierarchies of control. At the lowest level, individual low level elements may be directly controlled. At the next level, combinations of elements and simple associated subsystems may be directly controlled. At the next level higher, procedures may be specified. Other approaches are of course possible as is clear to one skilled in the art.

It is advantageous if a common language and/or protocol can be used for each level of the hierarchy of commands regardless of the target. This common language and/or protocol may be structured in subsets, libraries, function calls, etc. and may optionally or advantageously be extensible and/or open.

Figure 16A:
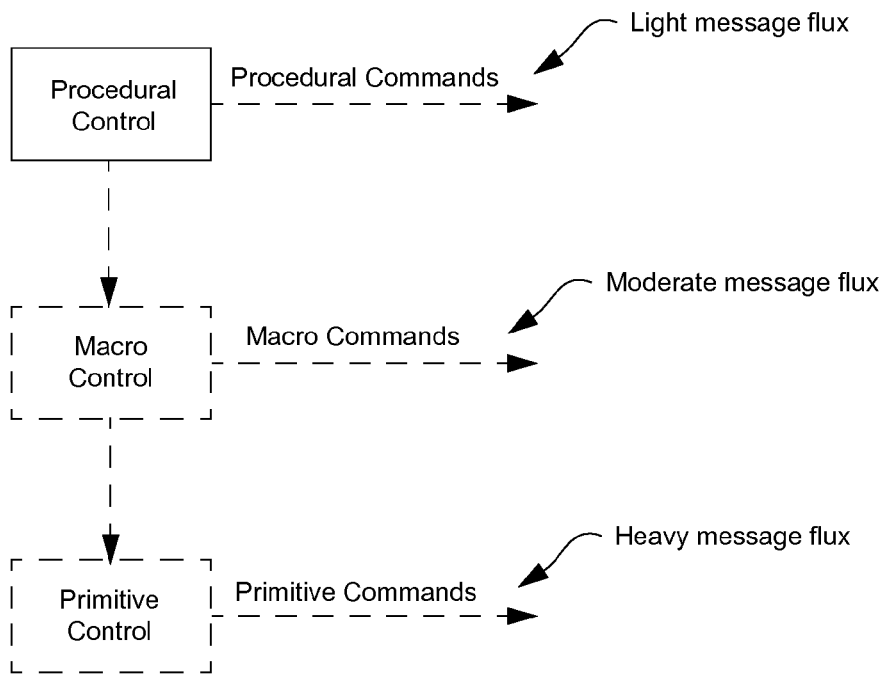
FIG. 16a shows an exemplary message flux typically associated with a task at various levels in the hierarchy of commands.
Figure 16B:
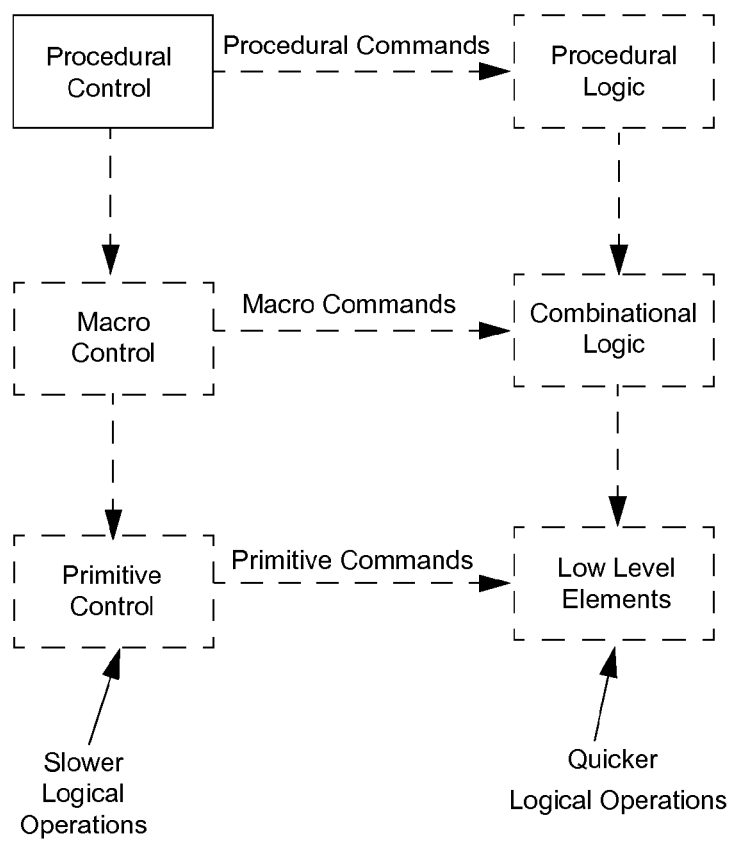
FIG. 16b shows exemplary response times for operations executed in a general software control system (left column) versus a control system closer to the target that may likely use dedicated electronics or other hardware (right column).

FIG. 16a shows a likely message flux typically associated with a task at various levels in the hierarchy of commands. In general, decomposing tasks into larger numbers of lower-level operations requires more commands per unit time, while aggregating lower level tasks into higher-level structures requires fewer commands per unit time FIG. 16b shows a likely response time for operations executed in a general software control system (left column) versus a control system closer to the target that may likely use dedicated electronics or other hardware (right column). There can easily be exceptions, but in many cases a control task that is done local to the target with dedicated hardware will be faster than the same task implement remotely in software and subsequently communicated.

Figure 17:
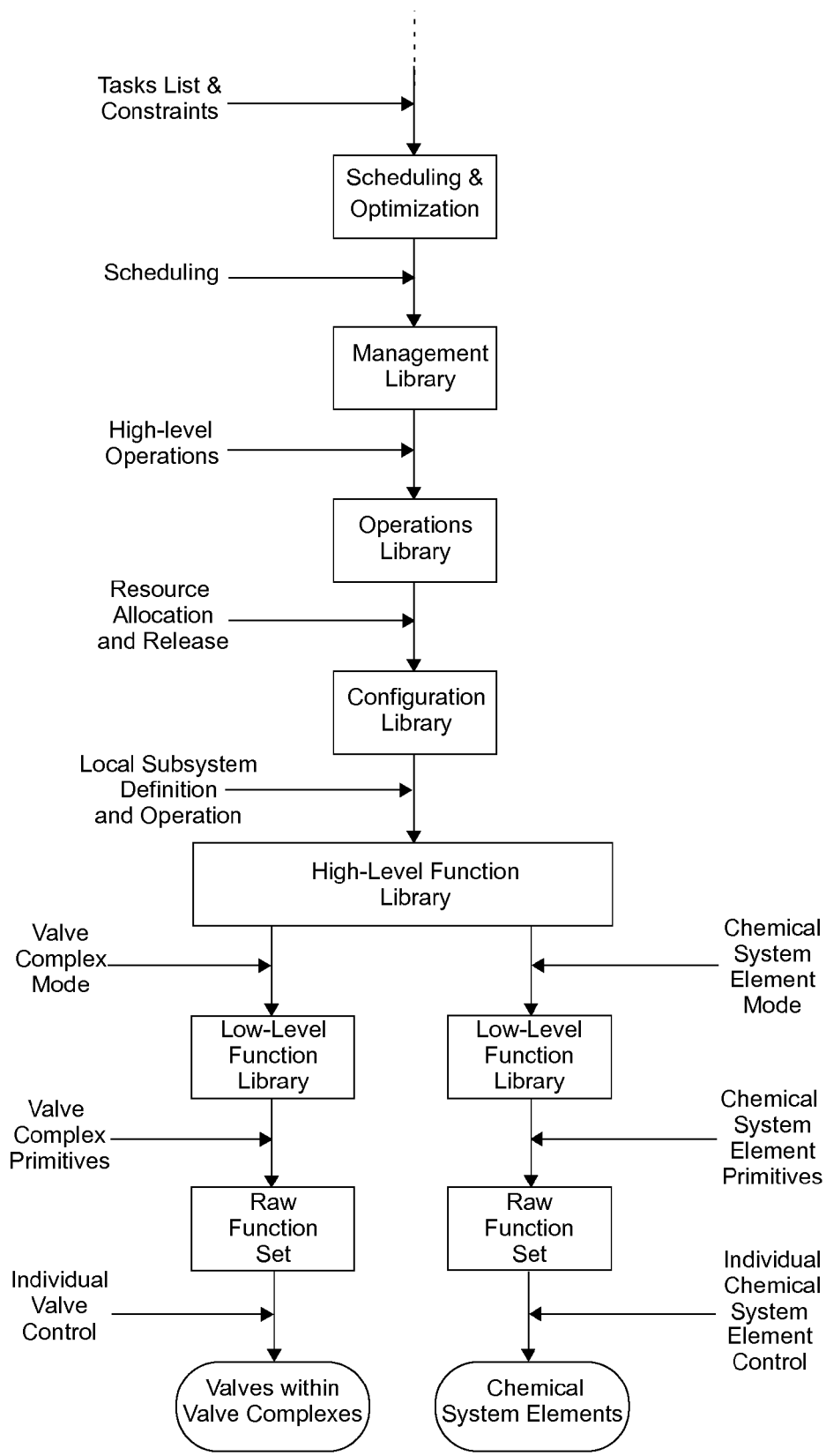
FIG. 17 depicts an example control software structure and interfaces comprising by an exemplary a multi-level control hierarchy.

FIG. 17 depicts an example control software structure and interfaces comprised by an exemplary a multi-level control hierarchy.

Emulation System

Software-controlled configurable and reconfigurable chemical process systems and methods applicable to LoC devices include, for example, those described in U.S. patent application Ser. No. 11/946,678 filed Nov. 28, 2007.

Of course, much of the interest in the physics of Lab-on-a-Chip devices arises from the fascinating fluid dynamics, sensor technologies, and clever devices intrinsically relying on micro-millimeter physical scale and nanoliter fluidic volumes. Without fabrication prototyping, research, design, and improvement of features requiring micro-millimeter and nanoliter scale may need to heavily rely on numerical modeling and simulation. However, when prototyping system topologies, process and fluidic, logistics, controller complexity, in situ reaction design, closed-loop sensor-input control system, clearing/cleaning designs, and many other features a physical emulation setup can provide tremendous value. This native value may be further enhanced by including one or more of control, sensing, data recording, and software development infrastructure(s) in a reconfigurable physical emulation setup.

Typically an emulation setup is highly customized around a particular envisioned LoC design. If aspects of the design are changed, the emulation setup typically requires rework, sometimes extensively so. By including software-controllable attributes into physical chemical process emulating modules themselves and/or by providing at least some degree of software-controllable interconnection, a physical emulation setup can be assembled to provide a range of topological and functional variations that can support a variety of designs and some, much, or all of the evolution of a particular design. Returning now to FIG. 2a, this figure provides an example of how a reconfigurable physical emulation setup can span several designs and design variations. In some situations, a reconfigurable physical emulation setup can be used to compare several competing designs. In other situations, a reconfigurable physical emulation setup can be used as a general "workbench" to explore completely unrelated design sketches or side experiments.

Figure 2A:
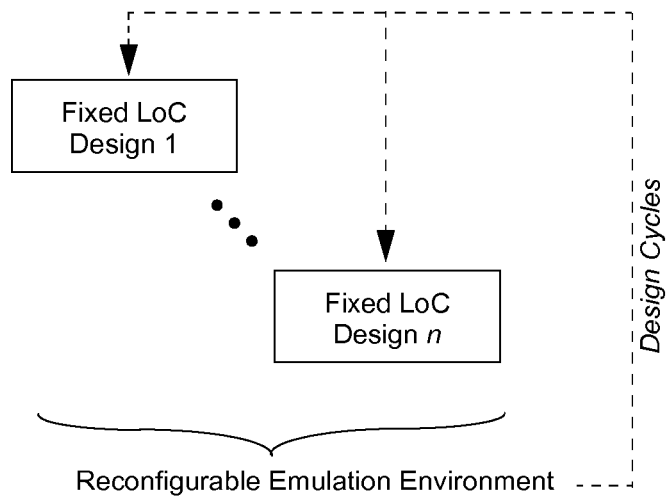
FIG. 2a shows use of a reconfigurable physical chemical process emulation setup as a tool for developing and conceptual testing of a plurality of fixed LoC systems.
Figure 2B:
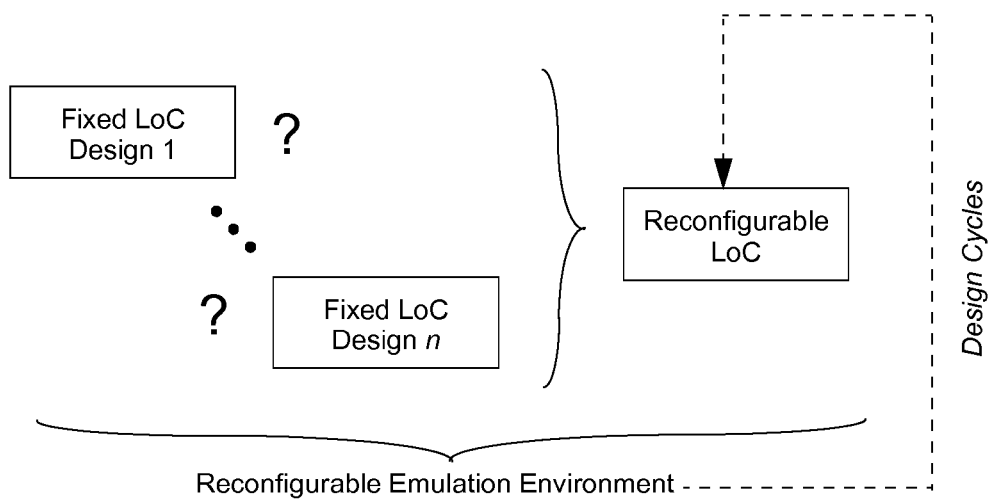
FIG. 2b shows use of a reconfigurable physical chemical process emulation setup as a tool for developing and conceptual testing of reconfigurable LoC systems.

In implementing such reconfigurable physical chemical process emulation setups, many of the systems and methods for software-controlled configurable and reconfigurable chemical process described in, for example, the above-identified U.S. patent application Ser. No. 11/946,678 may be adapted. Since these systems and methods thus apply to both reconfigurable physical chemical process emulation setups and reconfigurable LoC systems, there is both a great and natural utility in employing a reconfigurable physical chemical process emulation setup as a design tool to emulate reconfigurable LoC systems. Thus, in addition to the use of a reconfigurable physical chemical process emulation setup as a tool for developing and conceptual testing of fixed designs as shown in FIG. 2a, a reconfigurable physical chemical process emulation setup may be used as a tool for developing and conceptual testing of reconfigurable LoC systems, as suggested in FIG. 2b.

Additionally, as fixed and reconfigurable LoC systems become available they may in turn be used as components in later-generation larger-scale reconfigurable physical chemical process system.

One skilled in art will appreciate that the systems and methods taught in the examples below are exemplary yet readily extendable to a wide range of variations and adaptations. Such wide-ranging variations and adaptations are fully anticipated and as such are provided for herein.

An exemplary LoC emulation system may include combinations of:
- Electrically-controlled miniature fluid and gas (gating and routing) valves
- Small chemical reactors with thermal control
- Electrical output sensing elements for various physical quantities
- Interconnecting tubing
- Electrically-controlled (low DC voltage) fluid and gas transport
- Control interface electronics
- Sensor interface electronics
- Communications electronics The above elements and others may be organized into modules that may be designed to handle fluids, gasses, and mixed-media/vapors. These modules may include local control, power management, status indication, and communications electronics. In one approach to implementation, clocked "two-wire" bi-directional serial communications (such as $I^2C$ "Inter-Integrated Circuit" protocol) may be used. Other implementations may employ self-clocking "one-wire" bi-directional serial communications, parallel communication buses, etc. In some situations, it may be advantageous to employ commercial products such as those manufactured by Matrix Orbital and others that combine character/graphics displays, communications electronics, and on/off electrical outputs and inputs. In other situations, widely available communications chips, such as those made by Analog Devices and Dallas Semiconductor, providing addressable parallel latched data ports, DAC, ADC, temperature sensing, and other functions may be used as a principle component of communications electronics. In yet another implementation, simple addressable latch logic chips or discrete circuitry may be used.

One skilled in the art will appreciate that physical support and interconnection may be handled in a variety of ways. In one embodiment, modules may be in the physical form of a cuboid of various regulated sizes; these cuboid modules may plug into a backplane system and/or may comprise a free-form "patch panel" of electrical connectors and fluidic/gas ports.

In another embodiment, modules may be realized on microscope slides with side-mounted electrical and fluidic/gas port connections that "plug" into a backplane.

Figure 18A:
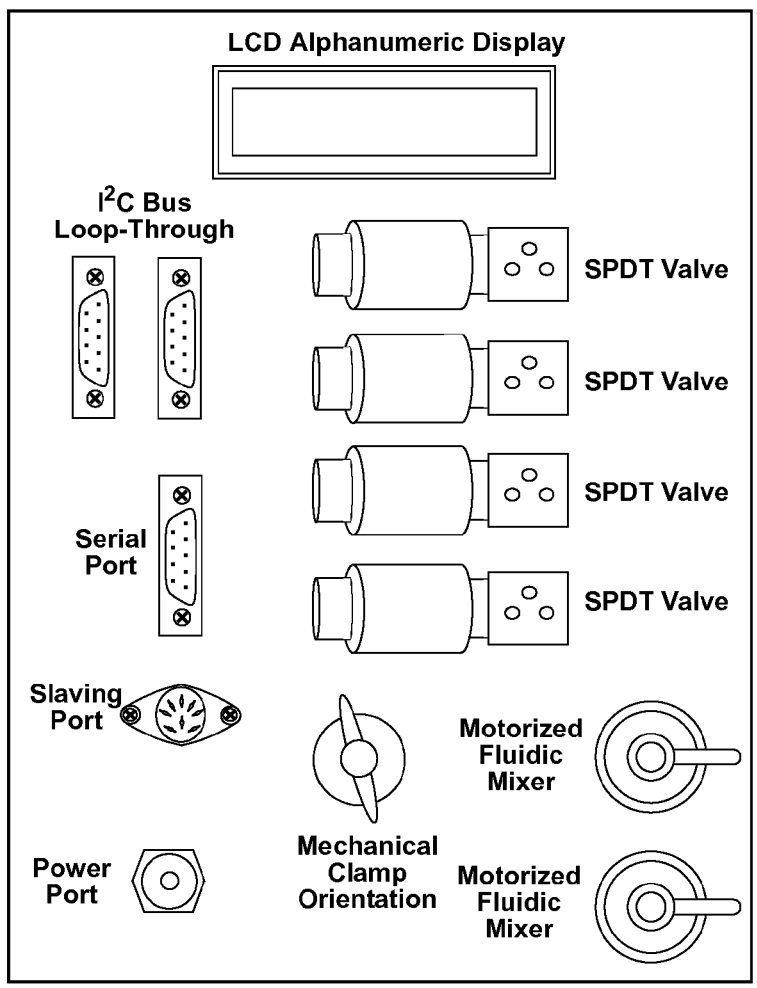
FIG. 18a depicts a primitive exemplary laboratory lattice-scale implementation of an exemplary module as provided for by an embodiment of the invention.
Figure 18B:
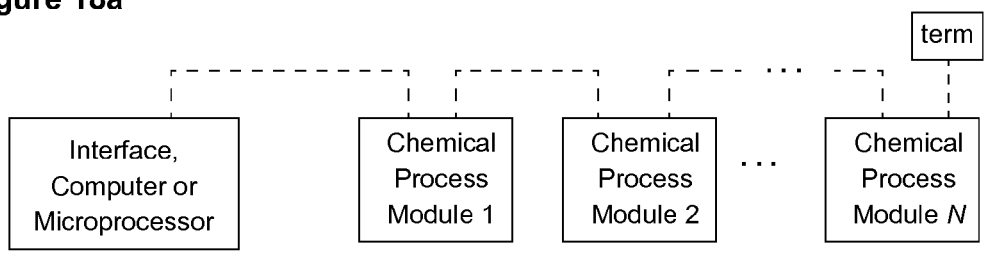
FIG. 18b depicts an exemplary loop-through implementation of communications bus connecting exemplary modules with a controlling computer or processor as provided for by an embodiment of the invention.
Figure 18C:
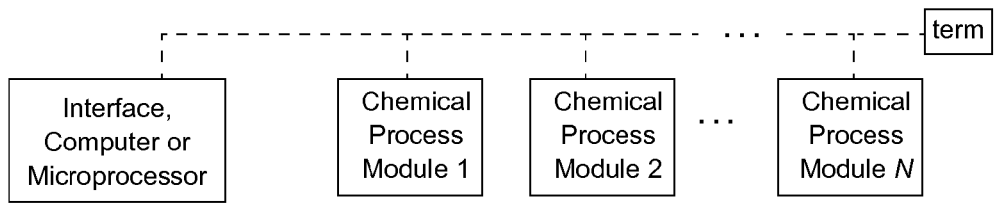
FIG. 18c depicts an exemplary backplane implementation of communications bus connecting exemplary modules with a controlling computer or processor as provided for by another embodiment of the invention.

In another embodiment, laboratory lattice clamps may be used for support, electrical connectors are provided for power and signals, and fluidic/gas connectors used to provide well-defined ports for the connection one or more types of tubing may be provided. A primitive example of this is provided in FIG. 18a. FIG. 18b depicts an exemplary loop-through implementation of a communications bus connecting exemplary modules with an interface, computer, or micro-processor as provided for by the invention. Typically the bus is daisy-chained as depicted by the dashed line in FIG. 18b, and the use of a pair of connectors on each module, connected between modules via a jumper patch cable, enforces this. The otherwise unused connector of this connector pair of the module at the end of the daisy-chain is provided with an electrical bus termination element (to prevent reflections that would corrupt high-speed communications as is appreciated by those skilled in the art of electronics). The electrical bus termination element may be implemented as a plug-in that mates with the otherwise unused connector (in place of the jumper patch cable), or may be implemented as an auto-sensing switched termination. In other embodiments, such as that depicted in FIG. 18c, a path on an electrical backplane is used to provide the communications bus, and the electrical backplane internally provides the electrical bus termination element.

Typically each of the communications elements sharing the $I^2C$, 1-wire, or other bus is set to a different unique bus address. Each module will have a range of addresses assigned to it. Typically addresses are set by wiring specific pins to selected binary voltage levels; this may be handled by DIP switches, hard-wiring, or other techniques. In some embodiments (such as the Matrix Orbital products), the address may be downloaded by a configuring or controlling computer or processor.

Market Evolution

Figure 19:
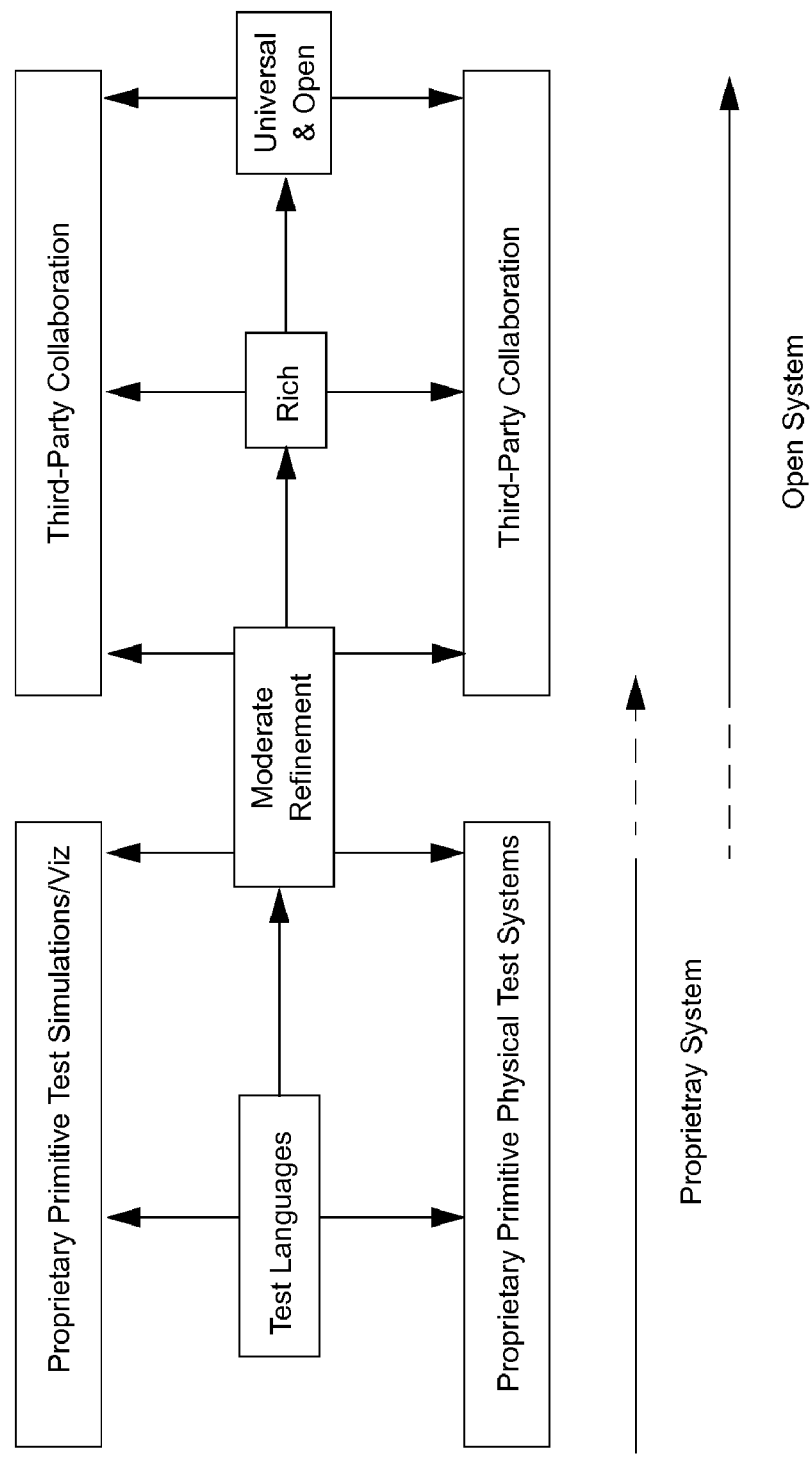
FIG. 19 shows an evolution path from an initial proprietary implementation into an open system.

FIG. 19 shows an evolution path from an initial proprietary implementation into an open system. Other approaches are possible as are clear to one skilled in the art.

While the invention has been described in detail with reference to disclosed embodiments, various modifications within the scope of the invention will be apparent to those of ordinary skill in this technological field. It is to be appreciated that features described with respect to one embodiment typically may be applied to other embodiments. Therefore, the invention properly is to be construed with reference to the claims.

What is claimed is:

1. A computer system for simulating a reconfigurable Lab-on-a-chip ("LoC") device, the system comprising:
   a memory that stores binary data and software; and
   a processor in communication with the memory that:
      creates a specification file using a specification system stored in the memory, the specification file used to create a numerical model for a planned LoC configuration comprised of a plurality of microfluidic components within the reconfigurable LoC device, wherein the specification file comprises a list of microfluidic components, an attribute for at least one of the microfluidic components, and an interconnection among the microfluidic components, and wherein an authoring/editing tool creates and edits the specification file;
      executes a control design tool stored in the memory for creating and editing an operating language script, the operating language script for controlling the operation of the modeled LoC device;
      numerically simulates the operation of the model in real-time using a numerical simulation system stored in the memory, wherein the numerical simulation is derived from the specification file and the operating language script; and
      displays results of the numerical simulation of the simulated model using a data visualization system stored in the memory;
   wherein the specification system, control design tool, numerical simulation system, and data visualization system are integrated into a common software development system for system development, software development, control programming, real-time numerical simulation, and visualization the modeled LoC device.

2. The system of claim 1, wherein the data visualization system superimposes a display of simulated operation on a graphical depiction of the modeled LoC device.

3. The system of claim 1, further comprising:
an interface to a software reconfigurable physical emulation system for providing emulated operation and measured emulation data in a real-time.

4. The system of claim 3, wherein the data visualization system superimposes a display of emulated operation on a graphical depiction of the modeled LoC device as described by the specification file, the display of the emulated operation responsive to the measured emulation data.

5. The system of claim 1, further comprising:
an interface to a software reconfigurable physical emulation system for providing emulated operation and measured emulation data at the end of an emulation time interval.

6. The system of claim 5, wherein the data visualization system superimposes the display of the emulated operation on a graphical depiction of the modeled system as described by the specification file, the display of the emulated operation responsive to the measured emulation data.

7. The system of claim 1, wherein the specification file comprises at least a list of interconnection among chemical ports of the microfluidic components.

8. The system of claim 1, wherein the specification file comprises a list of interconnection among signal ports of the microfluidic components.

9. The system of claim 1, wherein the specification file comprises a list of a subset of a plurality of microfluidic components, the subset serving as a subassembly in a larger assembly.

10. The system of claim 9, wherein the system is configured so that the specification file can be used to create multiple instances of the subassembly.

11. The system of claim 9, wherein the specification file is stored in a software library.

12. The system of claim 9, wherein the specification file is used in a different specification file associated with the larger assembly.

13. The system of claim 12, wherein the different specification file that is associated with the larger assembly is stored in a software library.

14. The system of claim 9, wherein the specification file is recalled and used in a different specification file associated with the larger assembly.

15. The system of claim 14, wherein the recalled specification file is subsequently edited.

16. The system of claim 14, wherein the different specification file associated with the larger assembly is stored in a software library.

17. The system of claim 1, wherein the operating language script comprises configuration commands and process commands.

18. The system of claim 1, further comprising:
a database to store specification files.

19. The system of claim 1, further comprising:
an interface to a fabrication design system.

20. An integrated computer system for the development of a software-controlled, reconfigurable Lab-on-a-chip ("LoC") device, the system comprising:
a memory that stores binary data and software; and
a processor in communication with the memory that:
specifies LoC elements, attributes of the elements and interconnections among the elements that uses a specification language file stored in the memory, the specification language file determining a model for an LoC device;
creates and edits the specification language file using an authoring/editing tool stored in the memory;
controls the modeled LoC device using an operating language script stored in the memory;
creates and edits the operational language script using a control design tool stored in memory;
produces real-time numerical simulation data of the modeled LoC device using a numerical simulation system stored in the memory;
displays the numerical simulation data in real-time using a data visualization system involving software system stored in the memory;
wherein the authoring/editing tool, control design tool, numerical simulation system, and data visualization system are integrated into a common system sharing the specification language file and operational language script.

* * * * *